United States Patent [19]
Carter et al.

[11] Patent Number: 5,860,132
[45] Date of Patent: Jan. 12, 1999

[54] STORAGE DISPERSAL SYSTEM BASED ON RELATED, SHARED DATA STORAGE SPACE RESERVATION

[75] Inventors: Robert Neil Carter; Howard Alan Disney; Kevin Scott Goldsmith; William Otto Vomaska, all of Tucson, Ariz., by Sandra I. Vomaska, legal representative

[73] Assignee: International Business Machines Corporation, Armonk, N.Y.

[21] Appl. No.: 773,810

[22] Filed: Dec. 19, 1996

Related U.S. Application Data

[63] Continuation of Ser. No. 68,494, May 27, 1993, abandoned.

[51] Int. Cl.$^6$ .................................................. G06F 12/00
[52] U.S. Cl. ............................ 711/170; 711/171; 707/200
[58] Field of Search .................................... 711/115, 170, 711/171, 173; 707/1, 200

[56] References Cited

U.S. PATENT DOCUMENTS

| | | | |
|---|---|---|---|
| 4,558,413 | 12/1985 | Schmidt et al. | 395/600 |
| 4,897,781 | 1/1990 | Chang et al. | 395/600 |
| 5,012,405 | 4/1991 | Nishikado et al. | 364/200.1 |
| 5,058,162 | 10/1991 | Santon et al. | 380/25 |
| 5,084,815 | 1/1992 | Mazzario | 395/800 |
| 5,109,484 | 4/1992 | Hughes et al. | 395/600 |
| 5,113,519 | 5/1992 | Johnson et al. | 395/600 |
| 5,247,660 | 9/1993 | Ashcraft et al. | 707/205 |
| 5,390,315 | 2/1995 | Blandy et al. | 711/112 |
| 5,491,807 | 2/1996 | Freeman et al. | 711/1 |

OTHER PUBLICATIONS

S.A. Eilbott, "File Access Staging Facility for Computer Systems", IBM Technical Disclosure Bulletin, Jun. 1992, pp. 7–9.

*Primary Examiner*—Jack A. Lane
*Attorney, Agent, or Firm*—Baker Maxham Jester & Meador

[57] ABSTRACT

A system and method are provided for dispersing storage of a plurality of related and unrelated data items on a plurality of removable recordable media instances (RMIs). A first storage device is provided for storing a data item on a qualifying related RMI, the qualifying related RMI having one or more related data items stored on it and having sufficient actual storage space remaining for storing the data. A multiplier device is connected to the first storage device for multiplying the actual size of a data item, which is not stored by the first storage device because there is no qualifying related RMI, by a factor greater than one, to produce reserved storage space data which characterizes any other RMI that actually stores the data item. A second storage device, which is responsive to the multiplier device is provided for storing a data item on a qualifying unrelated RMI, the qualifying unrelated RMI having one or more unrelated data items stored on it and having sufficient actual and unreserved storage space remaining to store the data item and, if there is no qualifying unrelated RMI, then storing the data item on a new RMI the new RMI having no data stored on it. This arrangement provides for shared logical space reservation so that physical proximity of related data items is optimized with respect to a set of RMIs.

36 Claims, 7 Drawing Sheets

STORAGE DISPERSAL SYSTEM BASED ON RELATED, SHARED DATA STORAGE SPACE RESERVATION

This application is a continuation of application Ser. No. 08/068,494, filed May 27, 1993, now abandoned.

BACKGROUND OF THE INVENTION

1. Field of the Invention

The present invention relates to a system for storing related and unrelated data items on a plurality of removable recordable media instances (RMIs), and more particularly to a system which will reserve RMI storage space so that related data items are grouped together even though they are stored at different times.

2. Discussion of the Related Art

The grouping of information by subject matter is basic to any library. For instance, in a library for books, the librarian typically reserves shelf space for a subject book, particularly when the subject matter is an active one. While this is relatively easy for a book library, it is much more difficult to arrange subject matter on electronic media in electronic storage devices. With electronic media, one deals with data items instead of books. A data item can be a word, a sentence, a normal book, larger than a normal book, or any size of drawing. When a number of electronic media producers or processors, such as personal computer workstations, store data items, it is more efficient to store these data items at a central location rather than on individual memories of the personal computers. For example, if a large number of people were working at various personal computer workstations to develop and process data items which are required for a large project, such as building a missile, it would be desirable that each one of these data items be classified by subject matter and stored at a remote location for retrieval by any one of the workstation users. In order to make the retrieval of this information efficient, it is necessary that related subject matter be grouped into a common location within the remote storage device so that the accessing device does not have to access related data items from one end of the storage device to the other.

A prior art data file storage management system, available from the assignee of this application, eliminates the need for individual workstation users or groups of users to perform data storage space management on their limited storage devices. The system is a distributed file storage management system and is sold under the trademark "DFSMS", which is owned by the IBM corporation. With this system, space management is handled by a storage administrator who can cause data storage space requests from distributed workstation sites to be allocated based upon particular parameters dictated by the enterprise being served. The DFSMS system is primarily focused on permanently mounted storage media of the direct access storage device (DASD) type. This focus did not address the methodologies for effective utilization and optimization of storage and retrieval of data residing on media which is not permanently mounted.

The object access method (OAM), a component of a data facility product (DFP)/multiple virtual storage (MVS) available from the IBM Corporation stores data on "write-once-read-many" (WORM) optical media in a form that is permanent, as opposed to storage of erasable data on magnetic media. The advantage of optical media is that it can contain very large quantities of data and it can be demounted to allow other media to be used on the same optical read/write device. These optical read/write devices are placed in an optical library that can store many optical media volumes and mount/demount these volumes in one or more available optical read/write devices.

Currently, OAM stores data on any eligible optical media that is already mounted using the storage group constraints of the DFSMS product. The problem is that this can result in data being scattered across multiple instances of optical media in an optical library. This creates a retrieval problem in that two or possibly many more optical media must be mounted before all of the data needed by an application is made available.

The need is for a system for storing logically related data on the same or as few as possible removable recordable media instances (RMIs), such as optical disks or magnetic tape cartridges, so that this related data can be quickly accessed when the user desires to retrieve information on any particular subject. This system has to work regardless of time constraints. For instance, a piece of data may be stored today, then many months may pass before another piece of data, related to the first stored data, is stored. Accordingly, the system has to reserve storage space on the RMI on behalf of a system external to the RMI so that when the related data item arrives many months later it will be stored in proximity to the first stored data item. With such an arrangement, removable recordable media, such as optical disks and magnetic tape cartridges, can be efficiently utilized to store a large group of related data items which may be submitted for storage in multiple, separate transactions.

SUMMARY OF THE INVENTION

The present invention provides a system of dispersing storage of a plurality of related and unrelated data items on a plurality of removable recordable media instances (RMIs) so that these data items can be quickly accessed when it is time for retrieving them. This is accomplished by storing the data items on the RMIs utilizing a unique technique of reserving storage space on the RMIs when new data items are stored. A first storage device is provided for storing a data item on a related RMI, the related RMI having a related data item stored on it and having sufficient actual storage space remaining for storing the data item. A multiplier is connected to the first storage device for multiplying the actual size of a data item, which is not stored by the first storage device, by a factor greater than one to produce reserved storage space data which characterizes any other RMI that actually stores the data item. Otherwise, if the first storage device cannot store the data item on the related RMI, the data item will be stored on some other RMI in which case the system will ensure that there is additional space, in the form of reserved storage space, which can be utilized by subsequently arriving related data items. The system is flexible enough to be adjusted for various amounts of reserved storage space necessary to accommodate the anticipated storage space required for storing related data items. A second storage device is provided which is responsive to the multiplier. This second storage device stores a data item on an unrelated RMI which has one or more unrelated data items stored on it and has sufficient actual and unreserved storage space remaining to store the data item. If there is no such unrelated RMI, then the second storage device stores the data item on an RMI which is new because it has no data stored on it. This means that a data item can be stored on an RMI even though the RMI has other unrelated data items stored on it, provided there is sufficient actual and unreserved space on that RMI to accommodate the data item. If a data item cannot be accommodated because there is insufficient storage space on the RMI, then the data has to be stored on an RMI that has no data stored on it, namely, a new RMI.

The system is employed with a plurality of RMIs which are stored in different locations within a library. An RMI writing device, which is responsive to the first and second storage devices, can be employed for writing data items to the RMIs. A transport device, which is responsive to the first and second storage devices, can be employed for transporting selected RMIs between the library and the RMI writing device. A number of personal computer workstations can be included in the system. The workstations compose or process data items which are identified by subject matter and the actual size required to store them on RMIs. A read device can be connected to the workstations for reading data items on the RMIs. The transport device can also be employed for transporting selected RMIs between the library and the read device so that people at the personal computer workstations can efficiently retrieve numerous data items by subject matter. With this arrangement, any user at any workstation can obtain all of the data or a subset of the data regarding a particular subject matter stored from any of the workstations regardless of the time frame over which the data items were stored. This will be accomplished with a significantly improved access time since the transport device will make fewer mounts/demounts in order to make this data available during a read operation, where fewer=$\{n:1 \leq n << N\}$, which will become apparent by the following description.

An objective is to provide a system for disbursing the storage of a plurality of related and unrelated data items on a plurality of removable recordable media instances (RMIs) so that access time is improved when related data items are retrieved from the RMIs.

Another objective is to provide a system which will store a plurality of related data items at an identifiable location within a plurality of RMIs so that upon retrieval of the related data items, the time required to access the RMIs can be minimized.

A further objective is to reserve storage space on an RMI when data items are first stored on it so that subsequent data items, which have a relationship to any of the stored data items, can be later stored in the reserved space.

Still another objective is to provide a system including a plurality of distributed user workstations where related data items generated by these workstations can be stored on RMIs in respective proximate locations so that the workstation users can subsequently quickly access the data items by subject matter.

Still a further objective is to provide a system or systems, as set forth in the foregoing objectives, having data storage which can be easily adjusted to accommodate the estimated sizes of collections of related data items.

Still a further objective is to provide a method of dispersing storage of a plurality of related and unrelated data items on a plurality of RMIs so that storage access time is minimized.

These and other objectives will be better understood from the following detailed description, taken together with the below described drawings.

DETAILED DESCRIPTION OF THE PREFERRED EMBODIMENTS

Figure 1:
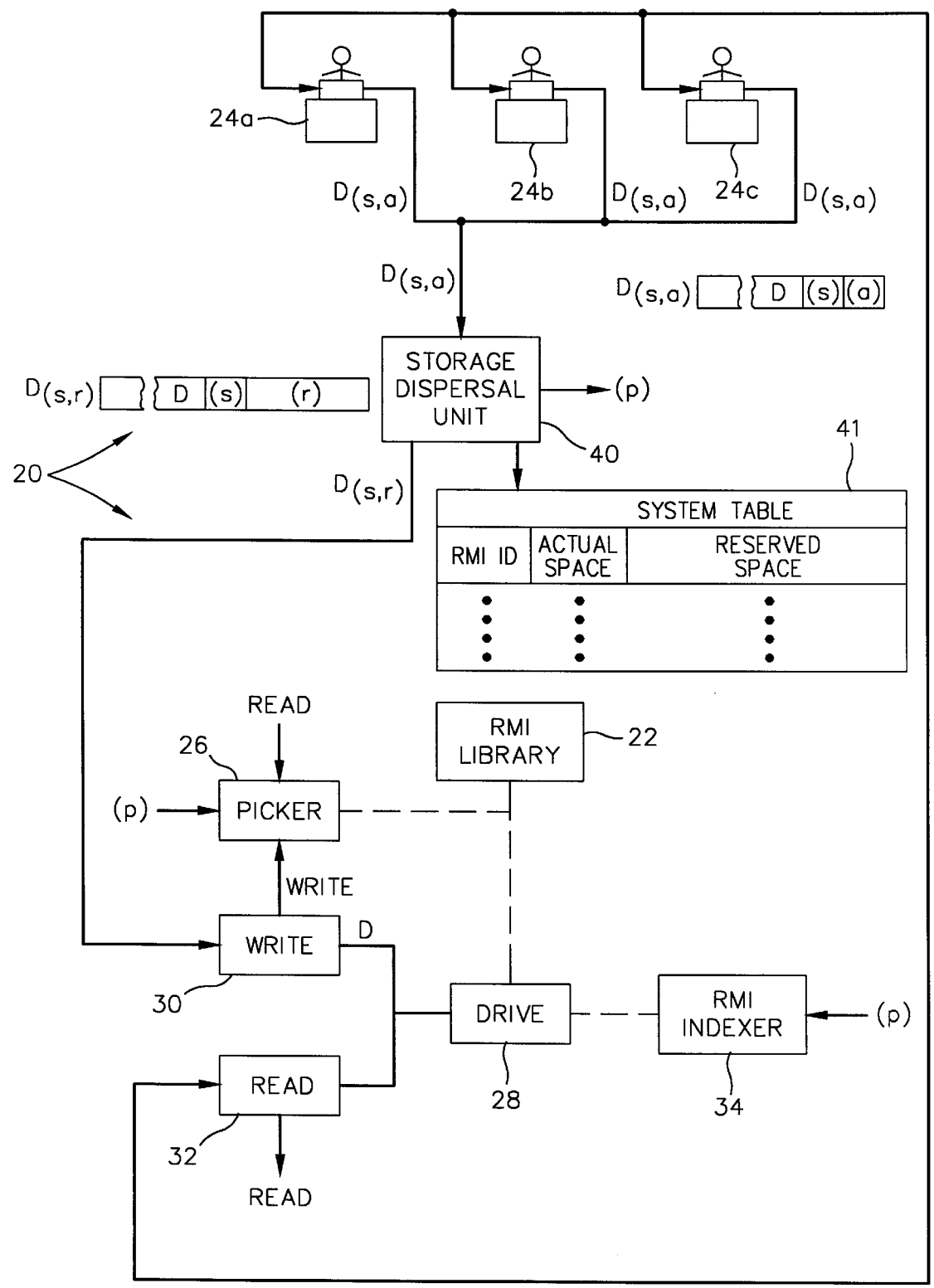
FIG. 1 is a diagram illustrating a number of users at personal computer workstations who store and retrieve their information from a RMI library, the storing of the information being handled by a storage dispersing system which enables improved access time when the information is retrieved.

Referring now to the drawings wherein like reference numerals designate like or similar parts throughout the several views, there is illustrated in FIG. 1 a system 20 wherein data items D are stored in a library 22 of removable recordable media instances (RMIs), such as optical disks, magnetic disks or magnetic tape cartridges. The data items D are generated or processed by a plurality of remote workstations, such as personal computer workstations 24a, 24b and 24c. At each workstation, control data is generated which produces controlled data item $D_{(s,a)}$.

A controlled data item $D_{(s,a)}$, generated or processed by the workstations 24, has three parts to it, as illustrated in FIG. 1. The largest part is the information part of the data which is represented by D. Smaller portions (fields) are provided to indicate subject matter (s) and actual size data (a). The subject matter field (s) represents the subject matter of a particular collection which includes all related data items. The subject matter field (s) is appended to data item by a user at a respective station 24 according to a breakdown of subject matters planned to accomplish a project. Once this labeling has been entered through the workstation, it becomes a field (s) of the controlled data item $D_{(s,a)}$. The field for actual size data (a) represents the actual storage space required by the corresponding data item D. Normally, it will not be entered by the user since the personal computer will compute this size. Rather, the storage space value in the field (a) may be calculated and entered using conventional storage management means.

The users at the workstations may be processing many data collections, the number of which depends upon the nature of the business that is being conducted. For instance, if the business involves developing a missile, broad subject matters may involve the mainframe, propulsion system, and guidance system. One of these broad subject matters can be further broken down into smaller subject matters. The propulsion system may include the combustion chamber, fuel injectors, and fuel lines. Even these subject matter groups can be broken down into smaller subject matter groups as desired. When all of the subjects are planned for a particular project, each one of the subjects will involve a collection of data items D, the collection including the increments of work of each user to accomplish the overall project. It would be impractical to store the data at each individual workstation since this does not make the information available to other users. Further, for large projects, the memory of an individual workstation could be too small. Therefore, it is common practice to store data items involving large projects at a single, central high capacity storage facility to which all users are connected and then access the storage facility when a user wants to recall the data of a particular subject matter. Various prior art systems organize data in a logical fashion on fixed, central, stored memory devices in order to improve the access time. One of the purposes of the present invention is to extend this capability to removable media such as that utilized in the RMI library 22. Removable media libraries are becoming quite popular because the data items are not stored on a singular memory device which can fail. Further, removable media of the optical disk type can store large volumes of data.

A typical RMI library 22 may include a plurality of optical disks (not shown). A picker assembly 26 may be employed to transport an optical disk from the RMI library 22 to a drive 28. Write and read devices 30 and 32 may be included in the drive 28 for either writing to or reading from an optical disk within the drive 28. It should be understood that instead of using optical disks, the RMI library could use magnetic tape cartridges or magnetic disks as desired.

The data items D of the various collections (subject matters) are stored in the RMI library 22 via a storage dispersal unit 40. The purpose of this storage dispersal unit is to ensure that the data items D corresponding to controlled data items $D_{(s,a)}$ are kept together in their respective collections in respective proximities within the RMI library 22. For example, it would be desirable for all of the data items of a particular collection to be located on an individual RMI, such as an individual optical disk. However, should the collection become quite large and require another RMI for storage, it would be desirable to keep the collection within two optical disks and so on. As will be explained in detail hereinafter, the storage dispersal unit 40 implements a method of reserving space for a new data item of a new collection so that subsequently arriving related data items are placed in close proximity, such as on the same optical disk. The amount of space reserved to achieve this purpose can be tailored depending upon the anticipated size of the collection.

As stated hereinabove, related data items are identified as belonging to a particular collection of data items, the particular collection being designated by the (s) field of a data item. In order to optimize the performance of the storage dispersal unit 40, it is desirable that, during an initial planning phase of storage management, the data items (subject matters) be kept relatively close in size. This can be accomplished by simply dividing the subject matters into sub-subject matters until the sizes are fairly close. The storage dispersal unit 40 will disperse data items D across a set of RMIs, in the library 22, each RMI accepting new collections until such time that the unit declares the RMI ineligible to accept new collections. Even though several hundred RMIs may be in the library 22, it is desirable to start from the beginning of the library, namely, RMI No. 1, and then store the data items D sequentially in some organized manner until the last RMI comes on line. This can be done by storing on one RMI at a time until the RMI is full or by storing across a set of RMIs, such as a set of five. If a set of RMIs is utilized, this set will progress sequentially up through the library until the set includes the last RMI. The set of RMIs can be referred to in a system table 41, the system table 41 listing a number of RMIs which are eligible to accept new collections. Once an RMI is ineligible to accept new collections, it can be removed from the system table 41 and a new RMI added which is the next RMI in the progression. The number of RMIs in a system table may depend upon the operating system environment or optionally can be simply an arbitrary number.

Each entry in the system table 41 is a multifield data object including fields for identifying an RMI, which collections are represented by data stored on the identified RMI, the amount of storage space used to store data on each RMI, and the amount of storage space reserved for storage of data on each RMI.

The system table 41 is managed by the storage dispersal unit 40. The storage dispersal unit also has access to a complete RMI directory (not shown) which lists every RMI in the library with a complete inventory of used and reserved space on the listed RMI. The storage dispersal unit 40 is enabled by conventional means to update the relevant inventory records in the RMI directory during the practice of the invention.

The system table 41 containing a predetermined number of RMIs may be empty in its initial state. When a data item of a new collection arrives, the system table 41 may be examined and if there are fewer than the predetermined number of RMIs, such as 3 RMIs instead of the 5 RMIs required for the set, a new RMI can be added to the system table 41 and the data item of the new collection placed thereon. Accordingly, the first data items of new collections up to the number of RMIs in the system table 41 would each be placed on a separate RMI until the number of RMIs in the system table 41 is filled. When each RMI in the system table 41 contains a data item of a new collection, then the storage dispersal unit 40 will examine the RMIs in the system table 41 to see if there is enough storage space in any of the RMIs to accept the reserved size of another new collection. If the answer is yes, the new data item can then be placed on the RMI within the system table 41 which has the lowest number of collections already stored on it. If there are several RMIs that fall into the latter category, then the data item can be stored on the lowest numbered RMI.

A feature of the invention is that the collections of data items are spread across the RMIs so that the data items of each collection are grouped into a respective proximate location within the RMI library 22. This is accomplished by reserving storage space at the proximate location where each new data item is stored. This reserved storage space can be based upon the estimated size of an average collection. It is desirable that this estimated size be somewhat less than the capacity of an individual RMI. The estimated size of a collection can be preplanned or it can be based on the size of the first data item D or an average of multiple data items D to be stored on a RMI. This estimated size then forms a basis for determining how much storage space to reserve on a particular RMI for subsequently arriving data items in the same collection of the same subject matter (s). If the estimated size of the collection is large, the reserved space would be large. The reserved space may also be used by any other data items on the RMI.

The storage space to be reserved can be achieved by multiplying the actual size (a) of the data item, shown in FIG. 1, by a factor greater than one. This will result in a sector of reserved storage space data (r) which can be substituted for the actual storage space data (a) in the space data field of the controlled data item; as shown to the left of the storage dispersal unit 40. This multiplication process is done by the storage dispersal unit 40. Optionally, the storage dispersal unit 40 could be programmed with a fixed actual size (a), based upon the estimated size of a respective collection, rather than using the precise actual size of a data item issuing from any one of the workstations 24. In one version of the invention the actual space (a) of each data item D can be multiplied by a constant factor to produce the reserved storage space data (r) of the data item D. In a more sophisticated version, especially where the collection sizes significantly differ, the actual size data (a) of the data item D can be multiplied by a predetermined factor, each factor corresponding to a respective collection. This would be done by the storage dispersal unit 40 by identifying the subject matter (s) of the data item D and using a corresponding factor. In either event, the storage dispersal unit 40 will create reserved space data (r) if: (1) the data item D is unrelated to any previously stored data items, or (2) the data item cannot be stored on a RMI which contains related data items because the RMI has insufficient actual storage space remaining to store the data item. When this occurs, the controlled data item becomes $D_{(s,r)}$. Logic in the dispersal unit 40 is then employed to reserve space in the RMI library 22 when a data item of a new collection is involved or when a data item of an existing collection is involved but there is insufficient space to store it. It should be noted that a controlled data item $D_{(s,a,r)}$ could be produced. As will become apparent hereinafter, this is not necessary since (r) is a predetermined known multiple of (a).

When an RMI has no data stored on it, its unreserved storage space is equal to its unused storage space. Such an RMI is classified as a new RMI. Once a data item D is stored on an RMI, the particular numbered RMI is characterized within the storage dispersal unit 40 as needing reserved space to accommodate subsequently arriving data items D within the same collection, namely, the same subject matter or any unrelated data already stored on the RMI or stored at a subsequent time on the RMI. The available storage capacity remaining of the particular RMI is the lesser of: (1) the actual storage space remaining, which is the original storage space of the RMI less the actual storage space (a) required by data item D or (2) unreserved storage space remaining, which is the original unreserved space minus the reserved space (r) required by the corresponding data item D. When the storage dispersal unit 40 receives a controlled data item $D_{(s,a)}$, it first looks at the RMIs presently within the system table 41 as well as RMIs which have been removed from the system table 41 to determine if there is a previously stored data item D which is in the same collection, namely, the same subject matter. If so, the storage dispersal unit 40 will store the data item D on that RMI provided there is sufficient unused space (actual storage space remaining) to store the data item. If none of the RMIs in the system table 41 of the RMI library 22 have sufficient unused space, even though they have a related data item stored thereon, the data item D will be further processed.

The further processing begins by multiplying the actual size data (a) of the controlled data item $D_{(s,a)}$ to produce a reserved storage space data (r). This then produces a controlled data item $D_{(s,r)}$. The controlled data item $D_{(s,r)}$ is then compared with storage space available on RMIs listed in the system table 41 to determine if there is sufficient available storage space (the lesser amount of unused storage space or unreserved storage space) to store the data item D which is part of the controlled data item $D_{(s,r)}$. If there is insufficient available storage space, the data item D is stored on a new RMI which is added to the system table 41. At this point, the RMI in the system table 41 which has the least amount of available storage space may be dropped from the system table 41 so that it is ineligible to accept data items D of new collections. The contents of system table 41 have now incremented up the sequence of RMIs by one and will continue to do so as long as this iteration is repeated. The data item D, corresponding to controlled data item $D_{(s,r)}$ is then stored on the new RMI. The storage dispersal unit 40 then characterizes this particular numbered RMI as having reserved storage space so that it can store subsequently arriving data items D of the same collection.

If during its examination the storage dispersal unit 40 finds that there is sufficient available space on a RMI listed in the system table 41, even though this RMI stores one or more unrelated data items, it will store the data item D on the RMI with one or more data items. If there is more than one such RMI, then it will be stored to the RMI which has the least number of collections stored on it. Should there be still more than one such RMI in this category, it will store the data item to the least numbered RMI listed within the system table. Since this data item is being stored on an RMI with unrelated data on it, storage space is reserved on this RMI for subsequently stored related data. Since the unrelated data item has reserved storage space and the just stored data item has reserved storage space the two reserved storage spaces are combined into a pool of reserved storage spaces which can be used for storing additional data items related to said unrelated data item and/or additional data items related to said just stored data item. The reserved storage space (single or pooled) serves as a constraint for allowing storage of a data item unrelated to any data item on the RMI. If the constraint does not stop storage of a data item along with its reserved storage then additional data items related to any data item on the RMI can be stored in the pool of reserved storages. It should be noted that the storage dispersal unit 40 will employ the RMI directory to examine any RMI number that is dropped from the system table 41 to see if there is enough unused space on it to store a related data item D. Such an RMI will continue to accept related data items D until there is no more unused space remaining to accommodate another related data item.

In most instances, it is practical for more than one collection of data items to be stored on a single RMI. While the data items D are ideally of approximately the same actual size (a), the storage dispersal unit 40 will allow for a variance. The reserved space (r) of a data item D is subtracted from the unreserved space left on a particular RMI without being bound to any particular collection. A subsequently arriving data item for any collection already stored thereon can be stored provided there is sufficient unused actual storage space remaining on the RMI.

It should be noted that as the number of RMIs in a set of RMIs is increased, the potential for a collection to grow over time on a single RMI is increased while the potential that a new collection can be placed on that particular RMI is decreased. Conceivably the number of RMIs in a system table could initially include all of the RMIs within the RMI library 22. A value as low as 2 RMIs within a system library can be beneficial if it results in 2 data objects of the same collection residing on the same RMI in contrast to these data objects residing on two different RMIs. As stated hereinabove, if the anticipated number of data items for a collection is expected to be high, the factor multiplied times the actual size data (a) should be correspondingly high to reserve sufficient space for subsequently arriving data items. If the number of data items per collection is expected to be low, then the factor should be tailored to a lower number so that less space is reserved on the particular RMI. This type of planning will minimize wasting storage space of the RMIs for data items that never arrive.

As shown in FIG. 1, data items corresponding to controlled data items $D_{(s,a)}$ or $D_{(s,r)}$ are stored in the RMI library 22 via the storage dispersal unit 40. The controlled data item $D_{(s,a)}$ activates the write device 30 which, in turn, activates the picker 26 which in turn transports an RMI from the library 22 to the drive device 28. The write device 30 then writes the data item D part of the controlled data item $D_{(s,a)}$ onto the RMI. The RMI is then returned by the picker 26 to the RMI library 22 and the storage dispersal unit 40 keeps track of whether actual storage space was used or both actual and reserved storage space was used within the RMI library 22. When a user at any one of the work stations 24 desires to obtain any or all of the data items of any particular subject matter (collection) the user will address the read device 32 which will, in turn, address the picker 26 which will, in turn, utilize data information (p) from the storage dispersal unit 40 to transport the appropriate RMI to the drive 28. An RMI indexer 34, which also receives the data information (p), will index the RMI to the appropriate location for the read device 32 to access the selected collection.

The inventors contemplate that the storage dispersal unit 40 may comprise a dedicated electronic processor incorporating customized architecture to perform its function, as a programmable digital processor which executes programmed instruction sequences embodying its functions. In any event, the unit would be collocated with the electronics normally associated with RMI library components.

Figure 2:
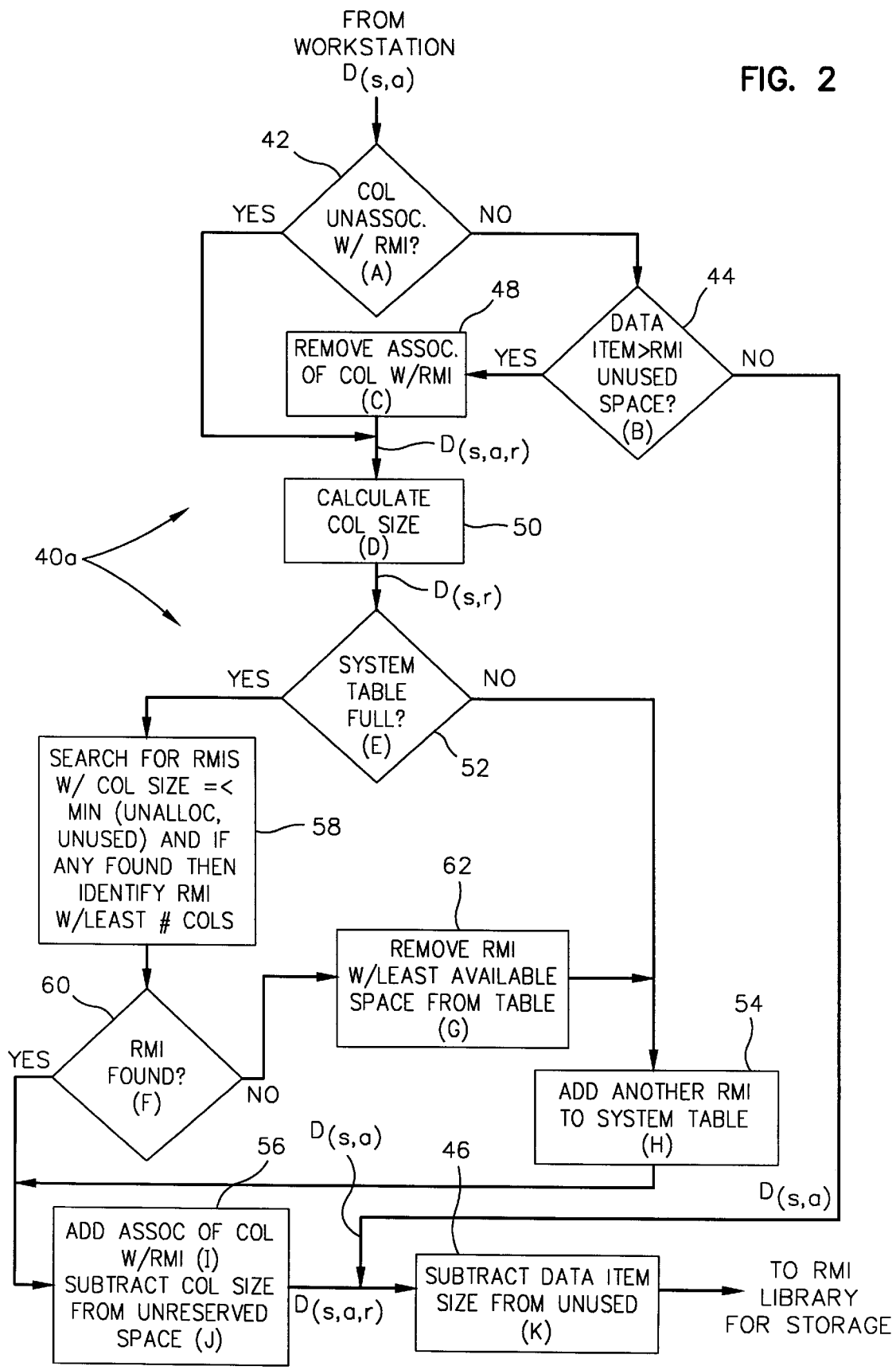
FIG. 2 is a logic diagram of one embodiment of the storage dispersal system.

FIG. 2 is a flow chart showing operation of an exemplary storage dispersal unit 40. The controlled data item $D_{(s,a)}$ arrives from a user station and the logic decision 42 asks whether the controlled data item $D_{(s,a)}$ has data D which is unrelated to any data items previously stored on the RMIs. If the answer is no, this means that there is a relationship and the operation flow branches to logic decision 44 where the question is asked whether the actual size (a) of the controlled data item $D_{(s,a)}$ is larger than the remaining unused actual storage space on that particular RMI. If the answer is no, there is sufficient space and the operation flow goes to logic step 46 where the data part of controlled data item $D_{(s,a)}$ is set for storage on that particular RMI after the actual size (a) of the controlled data item $D_{(s,a)}$ is subtracted from the unused space of the particular RMI. If the logic decision 44 determines that the storage space (a) required by data D of the controlled data item $D_{(s,a)}$ is larger than the unused storage space on the particular RMI, the answer is yes and the subject matter corresponding to controlled data item $D_{(s,a)}$ is disassociated from the collection within the particular RMI by logic step 48. The operation flow then transitions to a logic step 50 where the actual size (a) of the controlled data item $D_{(s,a)}$ is multiplied by a factor greater than one, to provide the reserved space data item (r) which represents the reserved storage space which is required for subsequently arriving related data items. If the decision block 42 decides that the data item is unrelated to any RMI, the operation flow branches to the logic step 50 where the aforementioned multiplication takes place to provide the reserved space data (r) which produces controlled data item $D_{(s,r)}$. The operation flow then transitions to a logic decision 52 where the question is asked whether or not the system table is full, that is, whether a set of RMIs is fully complemented. When the dispersal unit is first initialized there may be simply one RMI within the system table 41 when the system table 41 requires a number, such as five, to be completely full. In this instance, the answer at logic decision 52 would be no, in which case the flow branches to a logic step 54 where the next numbered RMI is added to the system table 41. From logic step 54, the flow transitions to logic step 56 where its relationship with a particular RMI is noted and the required reserved size of its data is subtracted from the remaining unreserved space on the particular RMI. From the logic step 56 the flow transitions to logic step 46 where the labeled data item $D_{(s,r)}$ is stored on the particular RMI after its actual size (a) is subtracted from the unused storage space on the particular RMI.

Going back to the logic decision 52, if the answer is yes, the operation flow branches to a function block 58 where a search is made for RMIs where the reserved size (r) of the controlled labeled data item $D_{(s,r)}$ is equal to or less than the lesser of the reserved or unused storage space remaining on any of the RMIs. If any such RMI is found, the RMI with the least number of collections is identified and the logic decision 60 answers yes or no to these inquiries. If the answer is no, this means that the data D of the controlled data item $D_{(s,r)}$ is too large for any of the RMIs and the operation flow transitions to the logic step 62 where the RMI with the least available space (least unused or unreserved space) is removed from the system table 41. After this the operation flow transitions to the logic step 54 where the next numbered RMI, which is new and has no data stored on it, is added to the system table 41. From the function block 54, the operation flow transitions to the logic steps 56 and 46 as described hereinabove.

If the answer at logic block 60 is yes this means that an RMI with one or more unrelated data items on it is found in the system table and that it has sufficient available space for the data D corresponding to controlled data item $D_{(s,r)}$. Upon the position exit from logic decisions 60 operation transitions to the function blocks 56 and 46 in the same manner as described hereinabove.

A more complete description of the logic diagram of FIG. 2 is set forth in Tables I and II which follow. Table I is a pseudo-code description of the logic diagram in FIG. 2 and Table II is a specific description of the various paths that the operation of the storage dispersal unit 40 can take between points A through K, as shown in FIG. 2.

TABLE I (PSEUDO-CODE for flow chart of FIG. 2)

```
/*   *********************************************   **
/
/*   if the data item of the collection is unassociated with a    */
/*   RMI (i.e., collection of data item needsto be associated     */
/*   with a RMI) or the collection is associated with a RMI,      */
/*   but the RMI does not have enough unused space to contain     */
/*   this data item (i.e., collection of data item needs to       */
/*   be associated with new RMI).                                 */
/*   *********************************************   **
/
If (collection unassociated with RMI) OR
|   (collection associated w/RMI AND data item > RMI UNUSED
space) then
/*   *********************************************   **
/
/*   If this is the case where current RMI associated with        */
/*   collection cannot contain data item (i.e., versus the        */
/*   INITIAL association of a collection with an RMI), then       */
/*   disassociate current RMI with the collection (i.e., so a     */
/*   new RMI can be associated with collection).                  */
/*   *********************************************   **
/
|   If (collection associated w/RMI AND data item >RMI UNUSED
            space) then
|   |   Remove association of collection with RMI
|   Endif
|   Calculate collection size
/*   *********************************************   **
/
/*   If the system table is full, then check each RMI in the      */
/*   system table for those RMIs that can contain the             */
/*   collection (i.e., based on the calculated collection         */
/*   size). If more than one RMI fits the criteria, then          */
/*   pick the RMI with the least number of collections            */
/*   already residing on it siinply to balance collection         */
/*   distribution.                                                */
/*   *********************************************   **
/
|   If system table is full then
|   |   Search system table for a RMI where collection size =<
            MIN(UNALLOC, UNUSED) /* NOTE: if >1 RMI found,
                            pick RMI w/least # collections  */
/*   *********************************************   **
/
/*   If no RMI fits the criteria, then remove the RMI with the    */
/*   least available space from the system table and add a new    */
/*   RMI to the system table.                                     */
```

TABLE I-continued

```
/*   ***************************************************   **
| |  If no RMI found then
| |  |  Remove RMI w/least available space from system table
| |  |  Add another RMI to system table
| |  Endif
/*   ***************************************************   **
/*   Otherwise system table is not full yet, so simply add a new/   */
/*   RMI to the system table.                                       */
/*   ***************************************************   **
|    Else /* system table is NOT full */
|    |  Add another RMI to system table
|    Endif
/*   ***************************************************   **
/
/*   Now that RMI has been identified, associate collection    */
/*   with RMI and subtract collection size from the UNALLOC    */
/*   space                                                     */
/*   ***************************************************   **
/
|    Add association of collection with RMI
|    Subtract collection size from UNALLOC space
ENDIF
/*   ***************************************************   **
/
/*   Lastly, subtract the data item size from the UNUSED space    */
/*   for RMI.                                                     */
/*   ***************************************************   **
/
Subtract data item size from UNUSED
```

TABLE II

| | | | PATHS | | | | |
|---|---|---|---|---|---|---|---|
| | | 1 | 2 | 3 | 4 | 5 | 6 | 7 |
| A | Y collection not associated with RMI | X | X | X | | | | |
| A | N collection associated with RMI | | | | X | X | X | X |
| B | Y data item size (a) > RMI unused space (a') | | | | X | X | X | |
| B | N data item size (a) ≦ RMI unused space (a') | | | | | | | X |
| C | remove association of collection with RMI | | | | X | X | X | |
| D | calculate collection size (r) | X | X | X | X | X | X | |
| E | Y system table full | X | X | | | X | X | |
| E | N system table not full | | | X | | | | X |
| F | Y search table and RMI found | X | | | | X | | |
| F | N search table and RMI not found | | X | | | | X | |
| G | remove RMI with least available space | | X | | | | X | |
| H | add another RMI to system table | | X | X | | X | X | |
| I | add association of collection with RMI | X | X | X | X | X | X | |
| J | subtract collection size (r) from unreserved space (r') | X | X | X | X | X | X | |
| K | subtract data item size (a) from UNUSED space (a') | X | X | X | X | X | X | X |

PATH DESCRIPTIONS

1—This is the case of a data item of a new collection where the system table contains a number of RMIs and one of the RMIs can contain the new data item. (This would be a fairly typical case for a data item of a new collection.)

2—This is the case of a data item for a new collection where the system table contains a number of RMIs, but the calculated collection size, appearing as reserved space(r), is too large to fit on any of the RMIs in the system table. As a result, the RMI with the least available space (i.e., the least likely to satisfy any future need) is removed from the system table and a new RMI is added. (This would be an exception case for a fairly large collection or a system table with a set of RMIs which are near their capacity.)

3—This is the case of a data item of a new collection where the system table is not yet full so a new RMI is simply added to the system table. (This would only be the case when this implementation is first put into place.)

4—This is the case of an existing collection where the data item to be stored will not fit on the RMI currently associated with the collection. As a result, the RMI is disassociated with the collection. The remainder is the same as path 1. (This would be an exception case when the RMI associated with the collection is near its capacity.)

5—This is the case of an existing collection where the data item to be stored will not fit on the RMI currently associated with the collection. As a result, the RMI is disassociated with the collection. The remainder is the same as path 2. (This would be an exception case for a fairly large data item or a system table with a set of RMIs which are near their capacity.)

6—This is the case of an existing collection where the data item to be stored will not fit on the RMI currently associated with the collection. As a result, the RMI is disassociated with the collection. The remainder is the same as path 3. (This would only be the case of an extremely active collection when this implementation is first put into place.)

7—This is the case of an existing collection where the data item to be stored will fit on the RMI currently associated with the collection. (This would be a fairly typical case for an existing collection.)

Figure 3A:
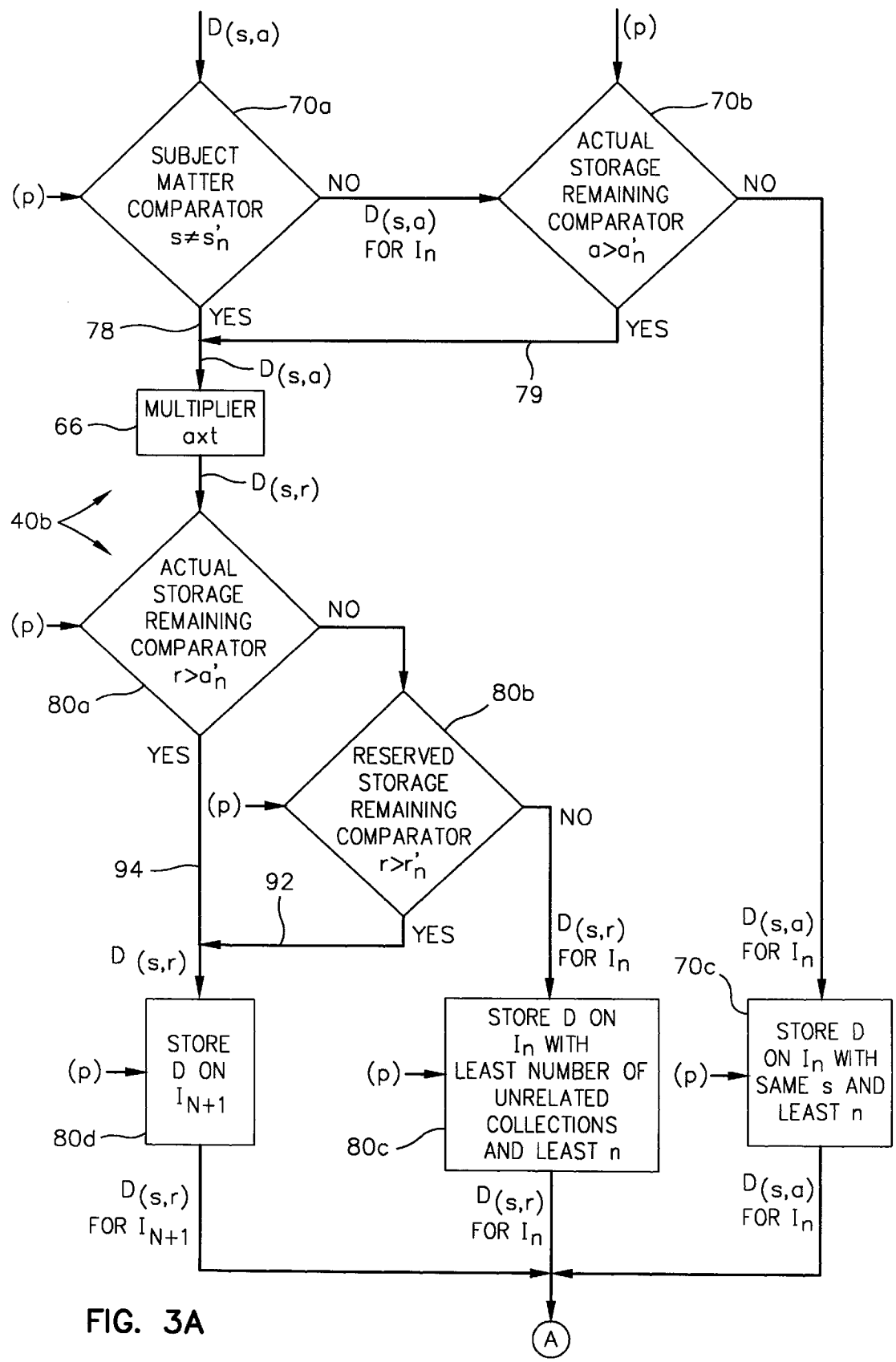
FIGS. 3A and 3B are diagrams illustrating still another embodiment of the storage dispersal system.
Figure 3B:
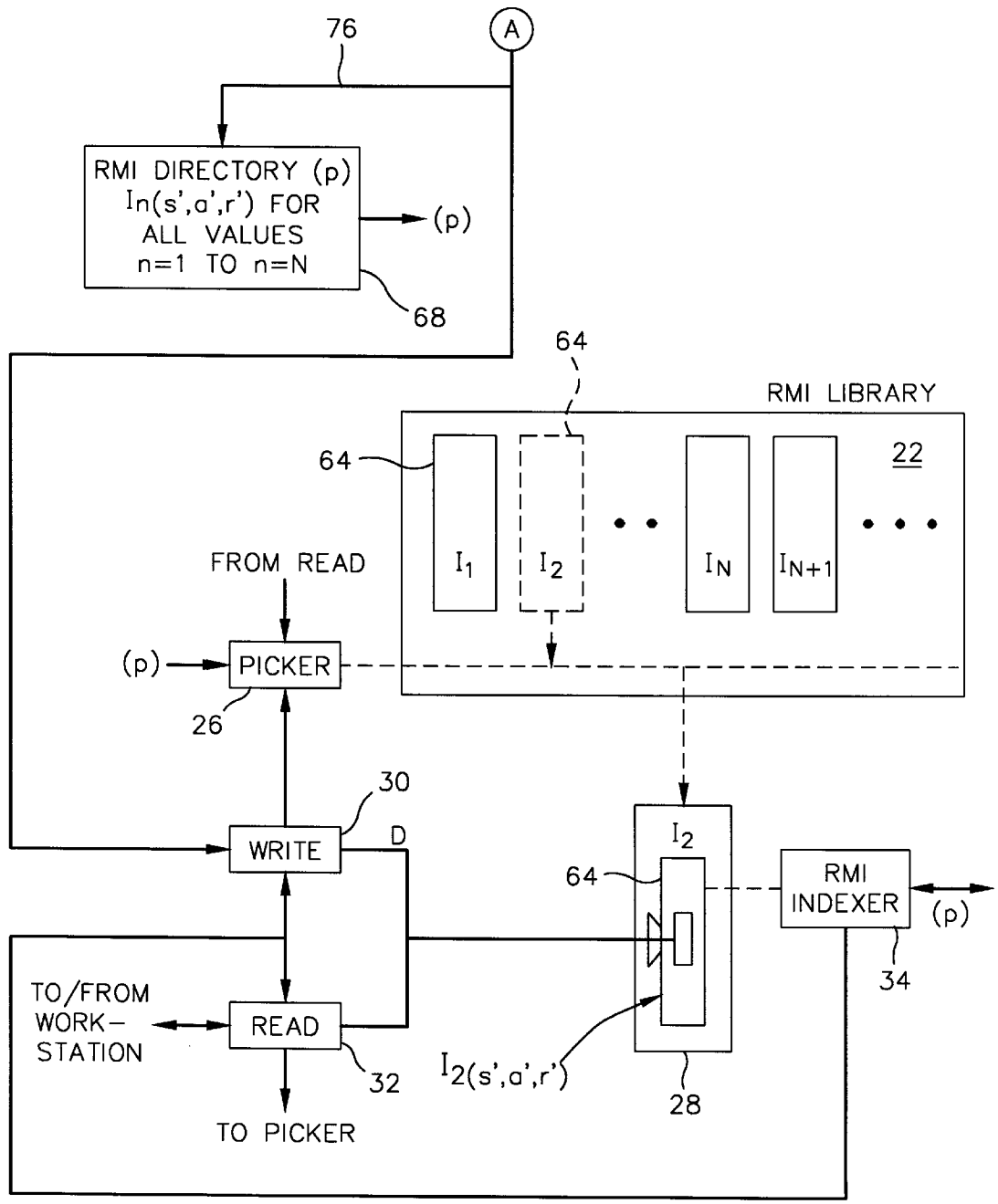

FIGS. 3A and 3B are an illustration of the data management system with another preferred embodiment 40b of the storage dispersal unit. The illustration combines operational flow with schematic representations of hardware elements of the data management system. In this embodiment, the RMI library 22 is shown as including a plurality of magnetic tape cartridges 64. The picker assembly 26, write and read devices 32 and 30, drive assembly 28, and the RMI indexer 34 are well-known prior art items for handling the cartridges 64. In an actual embodiment, the RMI library may include several hundred magnetic tape cartridges 64. Like the previously-described embodiment 40a, the storage dispersal unit 40b of FIGS. 3A and 3B disperses storage of a plurality of data items D across a plurality of removable, recordable media instances (RMIs), such as the magnetic tape cartridges 64. As stated hereinabove, each data item D is generated or processed by workstation 24, as shown in FIG. 1. In addition, each workstation generates control data for each data item D which represents subject matter (s) and actual amount of storage space (a) required on magnetic tape cartridge 64 to store the data item D. Accordingly, the data item D generated or processed by a workstation is part of a controlled data item $D_{(s,a)}$ where (s) is a field of data indicating the subject matter of the data item D and (a) is a field of data indicating the actual amount of storage space required by the data item D. It should be noted that the value with subject matter field (s) can be equated to an anticipated collection of data items which will eventually reside in the RMI library 22. If the users are working on a very large overall project, the number of collections, representing different subject matters, can be in the order of several hundred, thousand or more.

In FIG. 3B, each magnetic tape cartridge 64 can be designated by $I_{n(s',a',r')}$ if the cartridge 64 is partially full, by having one or more data items stored on it, and by $I_{N+1}$ if the cartridge 64 is the N+1$^{st}$ RMI and is new because no data item has been stored on it. n is the number of the cartridge 64 for all values of n from 1 to N. The field (s') includes data which indicates one or more subject matters of one or more data items stored on the Nth cartridge 64, (a') is data field indicating actual storage space remaining on the nth RMI and (r') is data indicating the reserved storage space remaining on the nth RMI. The purposes of the (s'), (a') and (r') data fields will become more apparent hereinafter.

The storage dispersal unit 40B includes a multiplier function 66 for receiving actual size data (a) of a data item and multiplying it by a factor (t), greater than 1, to produce data representing a reserved size (r) of the data item. The multiplier function 66 then provides a controlled data item $D_{(s,r)}$ which is the same as controlled data item $D_{(s,a)}$, except its size has been modified from actual size (a) to reserved size (r). The purpose of this multiplier device will become readily apparent hereinafter.

A RMI directory device 68 is provided for receiving subject matter data fields (s), actual size data fields (a) and reserved size data fields (r) of data items D stored on the magnetic tape cartridges 64 ($I_n$) for providing an updated cartridge 64 data field listing (p) of $I_{n(s',a',r')}$ for all values of n from n=1 to n=N where for each RMI corresponding to $I_{n(s',a',r')}$ an updated reserved size data r' is reserved storage reserved on said RMI corresponding to a data item stored on said RMI or a pool of combined reserved storages reserved on said RMI for said data item and one or more unrelated data items already stored on said RMI so that the updated reserved size data r' corresponds to reserved storage on said RMI which is available for storing any additional data items related to any data item already stored on the RMI. The RMI directory device 68 will keep track of the subject matters (s') of data items stored on the particular magnetic cartridges 64, the actual storage space remaining (a') on each magnetic cartridge and the unreserved space remaining (r') on each magnetic tape cartridge. This updating will take place each time a data item is placed within the RMI library 22. The full purpose of the RMI directory 68 will become apparent by the description hereinbelow.

A first comparator and storage device (70a, 70b, and 70c) is responsive to the data field listing (p) in the RMI directory 22 for receiving a controlled data item $D_{(s,a)}$ from one of the workstations 24 for storing the data item D on a related cartridge 64 ($I_n$), the subject matter data (s) of the data item comparing with the subject matter data (s') of the related cartridge 64 ($I_n$) within the RMI data field listing (p) and the actual size data (a) of the data item being equal to or less than the actual storage space (a') remaining on the related cartridge 64. This function starts with the introduction of the controlled data item $D_{(s,a)}$ into a subject matter comparator 70a. The comparator 70a also receives the data field listing (p) of all of the subject matters (s') of data items which have previously been stored on the magnetic tape cartridges 64 ($I_n$) for all values of n=1 to n=N. Accordingly, the comparator 70a compares the subject matter (s) of the controlled data item $D_{(s,a)}$ with all of the subject matters (s'$_n$) residing on the cartridges 64 which have data items on them. The comparator 70a asks the question whether or not the subject matter (s) is not equal to the subject matter (s'$_n$). If the answer is no, this means that there is related subject matter and the data item for the cartridge 64 ($I_n$) is identified and entered into an actual storage remaining comparator 70b. The comparator 70b also receives the RMI data field listing (p) from the RMI directory 68 which provides information to this comparator on actual storage capacity remaining (a') of each cartridge 64 which has previously stored data items for all values of n=1 to n=N. The comparator 70b then makes a comparison as to whether the storage space (a) required by the data item D for the RMI cartridge 64 $I_n$ is greater than the actual storage space (a') remaining on the cartridge 64. In practice, the comparator 70a will send to the comparator 70b all cartridges 64 which have the same subject matter for comparison. The comparator 70b will then decide whether any of these cartridges actually store the data items.

The first comparator and storage device, which includes components 70a, 70b, and 70c, also indicates any data item which is not stored on a related RMI. This occurs when the data item is not related to the subject matter on any magnetic tape cartridges 64 of the data field listing (p) or any data item which has an actual size (a) which is larger than the remaining actual storage space (a') of the cartridge or cartridges 64 ($I_n$) considered by the actual storage remaining comparator 70b. This function takes place when the subject matter comparator 70a says "yes" which means that the subject matter (s) of the data item does not relate to any subject matters (s'$_n$) in any of the cartridges $I_n$. A similar result happens when the subject matter comparator 70a answers "no" and the data item for one or more selected cartridges ($I_n$) has its actual storage (a) compared with the actual storage remaining (a') of the cartridge or cartridges which have the same subject matter. If the answer of the actual storage comparator is "no", this means that there are no cartridges 64 of the same subject matter which have sufficient actual storage space (a) to store the data item, in which case the controlled data item $D_{(s,a)}$ is sent to the multiplier 66.

Returning to actual storage remaining comparator 70b, if the actual storage (a) required by the data D corresponding to controlled data item $D_{(s,a)}$, is less than or equal to the remaining storage capacity (a') of one or more cartridges 64, which have the same subject matter residing thereon, the answer is "no", in which case the controlled data item $D_{(s,a)}$ for one or more cartridges ($I_n$), which have the same subject matter, is sent to a storage device 70c. The storage device 70c receives RMI data field listing information (p) from the RMI directory 68 and utilizes this information to store the data D part of the controlled data item $D_{(s,a)}$ on the least n of the one or more cartridges ($I_n$) which store the same subject matter. The controlled data item for a particular ($I_n$) is then employed to store the data item D in the RMI library 22 which will be described in more detail hereinafter.

The RMI directory device 68 is connected to the first comparator and storage device for receiving (s) and (a) data fields of data items D stored on the cartridges $I_n$ to recalculate the (s') and (a') data fields for the cartridges ($I_n$). This may be accomplished by feeding the controlled data item $D_{(s,a)}$ for the particular cartridge ($I_n$) to the RMI directory 68 via a path 76.

The multiplier device 66 is responsive to the first comparator and storage device (70a, 70b, and 70c) for receiving actual size data field (a) of any data item D provided the data item is not related to the subject matter (s') on any cartridge 64. This actual size data field (a) is fed to the multiplier device 66 by the subject matter comparator 70a via the path 78. The multiplier device 66 also receives any data item which is related to the subject matter or subject matters (s') on any one or more cartridges 64 provided the actual size (a) of the data item is greater than the remaining actual storage space (a') of the one or more cartridges 64 which have the same subject matter. The multiplier 66 receives this information from the actual storage remaining comparator 70b via the path 79. It should be remembered that the multiplier device 66 multiplies the actual size data field (a) of the received data item by a factor (t) to produce data representing the reserved size data field (r) of the data item so as to provide a labeled data item $D_{(s,r)}$ which is the same as controlled data item $D_{(s,a)}$ except its data field size has been modified from actual field size (a) to reserved data field size (r). The factor (t) is greater than 1. As will be more fully understood hereinafter, this multiplication ensures that the cartridges 64 in the RMI library 22 will reserve sufficient storage space to store subsequently arriving data items which have the same subject matter of one or more data items stored on the RMI. As will become more apparent hereinafter, this reserved storage space is noted in the RMI directory 68 and does not in any way take up storage space on any individual cartridge 64 within the RMI library 22. It should be understood that the data item along paths 78 and 79 is treated as a new data item which is not related to the subject matter (s') on any cartridge 64. The multiplier 66 characterizes such data item with a new enlarged storage space field (r) so that the controlled data item becomes $D_{(s,r)}$. It is this reserved space field (r) which will reserve space in the RMI library 22 for any subsequently arriving data items which are of the same subject matter of any one or more data items stored on the RMI namely, belonging to the same collection predetermined by the user at one of the workstations 24.

In FIG. 3A, a second comparator and storage device (80a, 80b, 80c, and 80d) receives the controlled data item $D_{(s,r)}$ from the multiplier device 66 for storing the data item D on an unrelated cartridge 64 ($I_n$), the reserved size (r) of the data item being less than or equal to the remaining actual storage size (a') of the unrelated cartridge and less than or equal to the remaining reserved size (r') of the unrelated cartridge 64 ($I_n$). These functions are accomplished by the components 80a, 80b, and 80c. An actual storage remaining comparator 80a receives the controlled data item $D_{(s,r)}$ from the multiplier device 66 and also receives RMI data listing field (p) from the RMI directory 68, this latter data entry providing information as to the actual storage space remaining (a') for all of the magnetic tape cartridges 64 which have already received prior data items for all numbered cartridges from n=1 to n=N. The comparator 80a makes a comparison as to whether the reserved storage space data (r) of the data item is greater than all of the actual storage spaces ($a_n'$) remaining on any of the cartridges from n=1 to n=N. If the answer is "no", this means that the RMI library 22 has one or more particular cartridges 64 which has sufficient remaining actual storage space (a') to store the data item. In this case, the data item along with data identifying the particularly identified cartridges ($I_n$) are fed to a reserved storage remaining comparator 80b which also receives the RMI data field listing (p) from the RMI directory 68 for indicating all of the subject matters ($r_n'$) for all of the particular cartridges 64 which have sufficient actual storage space (a') for all values of n from n=1 to n=N. The comparison is as to whether the reserved storage space of the data item D is greater than all of the remaining storage spaces on any of the particular magnetic cartridges 64 ($r_n'$). If the answer is "no", this means that there is one or more particular cartridges 64 which has sufficient storage space (r') remaining to store the data item. In this case, the data item D portion of $D_{(s,r)}$ is fed to the storage device 80c where various constraints can be imposed. In this embodiment, the storage device 80c will store the data item D on the particular cartridge 64 ($I_n$) which has the least unrelated data items D stored on it. If there is more than one such cartridge 64, then it will store the data on the particular cartridge which has the least number n. In order to implement these constraints, the storage device 80c receives RMI data listing information (p) from the RMI directory 68 to find the magnetic cartridge 64 which has the least number of unrelated collections and which has the least number n if there are more than one such cartridges 64. A controlled data item $D_{(s,r)}$ identified with the particular cartridge 64 ($I_n$) is then transmitted for implementing storage of the data item on the particular cartridge 64 in the RMI library 22. In order to keep track of what is going on, the data fields for the particular RMI are fed to the RMI directory 68 via the path 76 for updating the information $I_{n(s',a',r')}$. Optional constraints for the storage device 80c are discussed hereinafter for an embodiment shown in FIG. 4. The second comparator and storage means, which includes components 80a, 80b, 80c, and 80d, stores the data item to a new cartridge 64 ($I_{N+1}$), which has no stored data, if the data item is not stored on an unrelated RMI. This occurs if the reserved size (r) of the data item is greater than the remaining actual storage space (a') of the cartridge 64 ($I_n$) in the RMI data field listing (p) or if the reserved size (r) of the data item is greater than the remaining reserved storage space (r') on the particular cartridges ($I_n$). The components for accomplishing these particular functions are the actual storage remaining comparator 80a, the reserved storage remaining comparator 80b, and a storage device 80d. If the answer is "no" from the actual storage remaining comparator 80a and the answer is "yes" from the reserved storage remaining comparator 80b, this means that the reserved storage space (r) of the data item is larger than the remaining reserved storage (r') of the particular cartridges ($I_n$) for the values of n mentioned hereinabove. Upon this occurrence, the controlled data item $D_{(s,r)}$ is sent by the reserved storage remaining comparator 80b to the storage device 80d via the path 92. If the answer is "yes" by the actual storage remaining comparator 80a, then the reserved storage space (r) for the data item is greater than the actual storage space ($a_n'$) of any of the cartridges 64 which has data stored on them for all cartridges ($I_n$) from n=1 to n=N. In this instance, the controlled data item $D_{(s,r)}$ is transmitted to the storage device 80d via a path 94. The storage device 80d stores the data item D on a cartridge 64 which has no data item stored on it, namely, cartridge 64 which is designated $I_{N+1}$. The output from the storage device 80d is the controlled data item $D_{(s,r)}$ for the particular cartridge $I_{N+1}$. This output is employed to store the data item D on the cartridge $I_{N+1}$ in the RMI library 22. The actual implementation of this function will be discussed in detail hereinafter. This same output is fed to the RMI directory 68 via the path 76 for updating the information $I_{n(s',a',r')}$.

Figure 4:
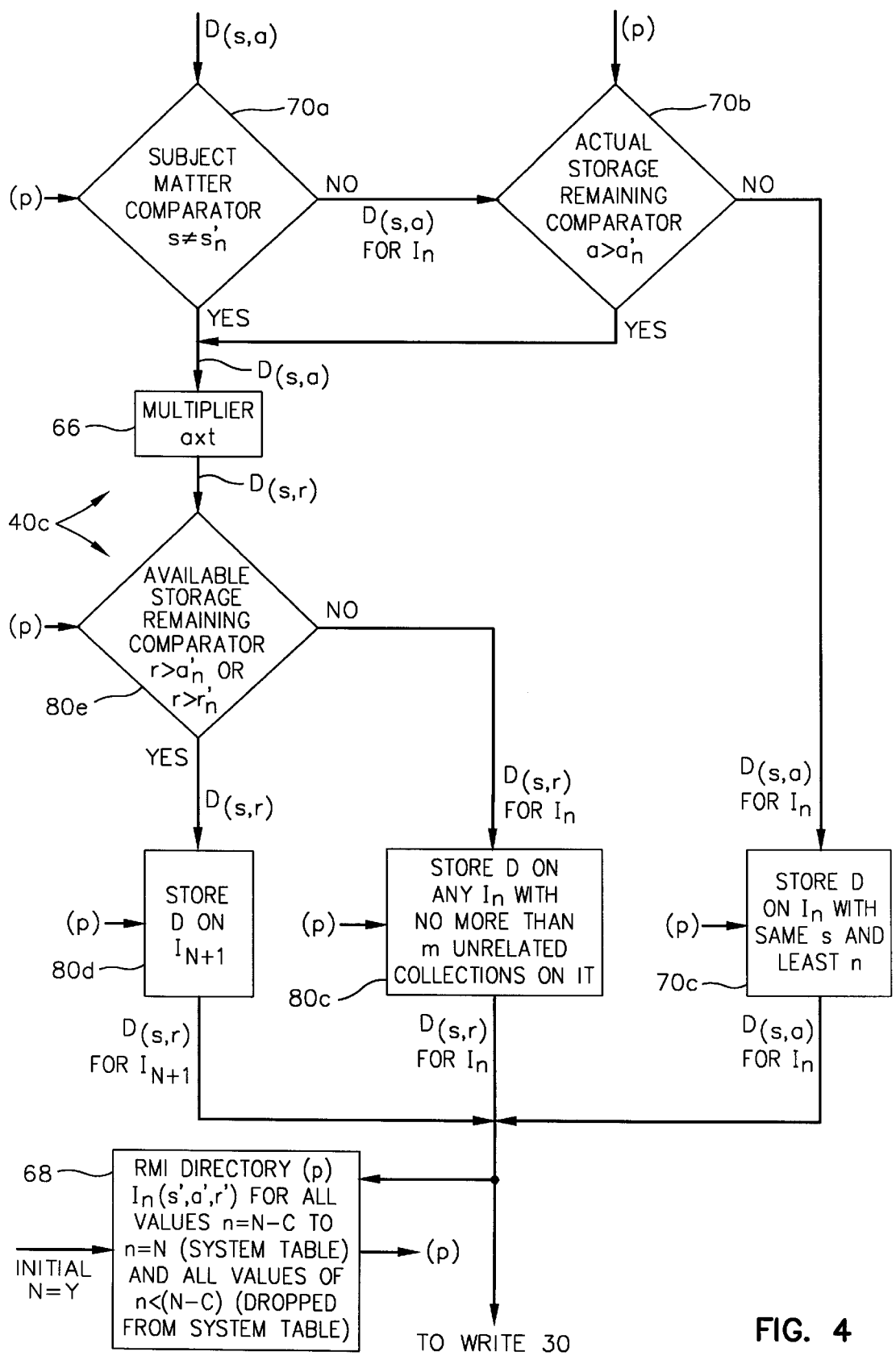
FIG. 4 is a diagram illustrating a modification of a portion of the storage dispersal system illustrated in FIG. 3.

FIG. 4 is a still further embodiment 40c of the storage dispersal system. This embodiment operates in the same way as the aforementioned embodiment 40b in FIG. 3 except different constraints are placed upon the storage device 80c and the RMI directory 68 and some of the storage comparators. Instead of the constraints shown in the FIG. 3 embodiment, the storage device 80c of the FIG. 4 embodiment stores data D on any magnetic tape cartridge ($I_n$) which has no more than m unrelated collections stored on it and should there be more than one such cartridge then it stores the data item D on the cartridge which has the lowest number n, where m is some finite number >/. Further, the RMI directory 68 may have constraints that establish the aforementioned system table which is a predetermined number of RMIs (cartridges 64) which can receive either related or unrelated data items being stored in the RMI library 22. As discussed hereinabove, the system table progresses from the beginning of the RMI library to its end which may be several hundred cartridges 64.

In the FIG. 4 embodiment, the number of cartridges 64 in the system table is a constant C so that n now represents the cartridges 64 within the system table which is n for all values n=N−C to n=N. As this system table progresses up through the numbered cartridges 64, it sequentially drops off next the next lowest numbered cartridge, (N–C)–1, to provide a set of all n less than (N–C). This occurs when the storage device 80d is adding a new cartridge ($I_{n+1}$). It should be noted that the cartridges dropped from the system table may still have sufficient actual storage space (a) for storing a related data item. If this is the case, the actual storage remaining comparator 70b will answer "no" and the storage device 70c will store the data item D on the particular cartridge dropped from the system table. The other modification in the FIG. 4 embodiment of the invention is that an available storage remaining comparator 80e is provided in lieu of the actual storage remaining comparator 80a and the reserved storage remaining comparator 80b in the FIG. 3 embodiment. The available storage is defined as the lesser of the actual storage remaining (a') and the reserved storage remaining (r') for all values of the cartridges within the system table n=N–C to n=N. If the remaining storage data (r) of the data item is greater than either the actual storage remaining ($a_n'$) or the reserved storage remaining ($r_n'$) of the cartridges within the system table, then the response is "yes" whereupon the storage device 80d performs it function. If the answer is "no", then the storage device 80c performs it function. It should be understood that the constraints mentioned for the storage device 80c and the RMI directory 68 are exemplary in that other constraints can be imposed without departing from the spirit of the invention.

Whenever the storage devices 70c, 80c, and 80d transmit their data which is controlled data item $D_{(s,a)}$ for $I_n$, controlled data item $D_{(s,r)}$ for $I_n$, and controlled data item $D_{(s,r)}$ for $I_{N+1}$, respectively, a data item will be stored on the RMI library 22. It should be understood that in the preferred embodiment, only the data portion D itself is stored on a particular magnetic cartridge 64 in the library. The (s), (a), (r) data fields and the particular numbered cartridge 64 ($I_n$ or $I_{N+1}$) are not stored in the RMI library 22, but are utilized for implementing the storage via the devices 26, 30, 32, and 34 and are utilized by the RMI directory 68 so that stored information data can be updated for all of the RMIs (cartridges) in the RMI library 22. When the implementing data fields are received by the write device 30, it will activate the picker 26 which will transport the appropriate cartridge 64 to the drive device 28 whereupon the write device 30 will write the data D to the transported cartridge 64. To ensure that the magnetic tape loaded in the drive 28 is at the appropriate location for receiving the written data, the RMI indexer 34 prepositions the magnetic tape before the writing function takes place. The RMI indexer 34 can receive its information from the RMI directory 68 to implement this function. The RMI indexer 34 will make sure that previously written data items are not overwritten and it may simply rewind the cartridge $I_2$ when it is substantially full of data. In this case, the RMI indexer 34 receives actual storage data field (a') remaining on a particular RMI to know when to rewind the RMI. The RMI indexer 34 also needs to receive information from the RMI directory 68 as to what portion of the storage space on a particular RMI contains a particular data item in order to operate the read device 32. When the read device 32 receives a request for a collection of data items from a workstation 24, it will address the picker 26 which will utilize appropriate RMI data field listing information (p) from the RMI directory 68 to transport the appropriate RMI from the library 22 to the drive device 28. The read device 32 will then read all of the requested data items in the collection stored on the cartridge to the personal computer at the requesting workstation 24. It should be understood that the RMI library 22 could use optical disks or magnetic tape disks in lieu of the magnetic tape cartridges 64 shown in the FIG. 3 and FIG. 4 embodiments. Both of the FIG. 3 and FIG. 4 embodiments provide a basis for either hardware or software implementations of the invention.

It is now readily apparent that broad concepts of the invention can be envisioned from the storage dispersal system embodiments 40a, 40b, and 40c described hereinabove. For example, in FIG. 3, the subject matter comparator 70a, the actual storage remaining comparator 70b, and the storage device 70c can be considered as a first storage assembly for storing a data item on a related RMI, the related RMI having related data item stored on it and has sufficient actual storage space remaining for storing the data item. The multiplier device 66 is connected to this first storage assembly. If the data item is not stored by the first storage assembly, the device 66 multiplies the actual data field size of the data item, by a factor t (greater than 1) to produce reserved storage space field data which characterizes any other RMI that actually stores the data item. Again referring to FIG. 3, the actual storage remaining comparator 80a, the reserved storage remaining comparator 80b, the storage device 80c, and the storage device 80d may comprise a second storage assembly, which is responsive to the multiplier device 66, for storing a data item D on an unrelated RMI, the unrelated RMI having one or more unrelated collections on it and having sufficient actual and unreserved storage space remaining to store the data item, and if there is no unrelated RMI, then storing the data item on a new RMI, the new RMI having no data item stored on it. This is a case where there is no RMI that has sufficient actual and unreserved storage space remaining to store the data item. The broad concept of the invention provides a basis for either hardware or software implementations of the storage dispersal system 40.

An even broader concept of the invention can be envisioned from the 40a, 40b, and 40c embodiments. For example, in FIG. 3 there are shown components for reserving space on a respective RMI: (1) if a data item D is stored on a new RMI, the new RMI having no data items stored on it, or (2) if the data item D is stored on an unrelated RMI, the unrelated RMI having one or more unrelated data items stored on it and having sufficient actual and unreserved storage space for storing the data item. All of the components of the storage dispersal system 40b play a part in performing these functions except the storage device 70c. The RMI directory 68 is especially active in performing the function of tracking and updating the information for the data items stored on the RMIs. The broad concept further includes a storing device, which is associated with the aforementioned reserving device, for storing a data item D on a related RMI, the related RMI having a related data item stored on it, and having sufficient actual storage space for storing the data item or, if the data item is not stored on the related RMI, then storing the data item on an unrelated RMI, the unrelated RMI having one or more unrelated data items stored on it and having sufficient actual and unreserved storage space remaining to store the data item or, if there is no unrelated RMI, then storing the data item on a new RMI, the new RMI having no data on it. All of the components of the storage dispersal system 40b in the FIG. 3 embodiment play a part in performing these storage functions. The broad concept provides a basis for hardware and/or computer implementations of the present invention.

The invention also provides a method for dispersing storage of a plurality of data items D across a plurality of removable recordable media instances (RMIs). This method may include the steps of providing each data item D with a corresponding controlled data item $D_{(s,a)}$ where (s) is a data field indicating the subject matter of the data item and (a) is a data field indicating the actual amount of storage space needed on a RMI to store the data item; designating each RMI by $I_{n(s',a',r')}$ if the RMI is partially full by having one or more data items stored on it and by $I_{N+1}$ if the RMI is the N+1 RMI and is new because no data item has yet been stored on it, where n is the number of the RMI for all values of n=1 to n=N, (s') is data indicating one or more subject matters of one or more data items stored on the nth RMI, (a') is a data field indicating actual storage space remaining on the nth RMI, and (r') is a data field indicating the reserved storage space remaining on the nth RMI; receiving actual size data field (a) of a data item and multiplying it times a factor (t), greater than 1, to produce a data field representing a reserved size (r) of the data item, thereby providing a controlled data item $D_{(s,r)}$ which is the same as controlled data item $D_{(s,a)}$ except its data field size has been modified from actual data field size (a) to reserved size data field (r); receiving subject matter field data (s) actual size field data (a) and reserved size field data (r) of data items stored on RMIs ($I_n$ and $I_N$) for providing an updated RMI data field listing (p) of $I_{n(s',a',r')}$ for all values of n from n=1 to n=N where for each RMI corresponding to $I_{n(s',a',r')}$ an updated reserved size data r' is reserved storage reserved on said RMI corresponding to a data item stored on said RMI or a pool of combined reserved storages reserved on said RMI for said data item and one or more unrelated data items already stored on said RMI so that the updated reserved size data r' corresponds to reserved storage on said RMI which is available for storing any additional data items related to any data item already stored on the RMI; receiving RMI data field listing (p) information and receiving controlled data item $D_{(s,a)}$ for storing the data item on a related RMI ($I_n$), the subject matter (s) of the data item comparing with subject matter data (s') of the related RMI ($I_n$) within the RMI data field listing (p) and the actual size data (a) of the data item being equal to or less than the remaining actual storage space (a') on the related RMI, and indicating any controlled data item $D_{(s,a)}$ which does not have its data D stored on a related RMI; receiving (s) and (a) data field of data items stored on the RMIs ($I_n$) to recalculate the (s') and (a') data fields for the RMIs ($I_n$); receiving a data item which was not previously stored and which is part of controlled data item $D_{(s,r)}$ and storing it on a particular RMI ($I_n$) the reserved size data field (r) of the data item D being less than or equal to the remaining actual storage data field size (a') and less than or equal to the remaining reserved size data field (r') of the unrelated RMI ($I_n$) and, if the data item is not stored on an unrelated RMI, the storing the data item on a new RMI ($I_{N+1}$), the new RMI having no data item D stored on it; and receiving the (s), (a), and (r) data field of data items stored on particular RMIs ($I_n$ and $I_{N+1}$) to recalculate the (s'), (a'), and (r') data fields of the RMIs ($I_n$). The method may further include such steps as: (1) storing the data item on the unrelated RMI ($I_n$) which has the least number of unrelated collections stored on it and which is the least n in the set n=1 to n=N or in a system table of a predetermined number of RMIs; (2) multiplying the actual size data field (a) of the data item by a factor (t) which is in the range of 2 to some finite number; (3) establishing a system table with a number N of RMIs which is some integer greater than 1.

A more broad method can be employed for the system of dispersing storage of a plurality of related and unrelated data items on a plurality of removable recordable media instances (RMIs). This method may include storing a data item on a related RMI, the related RMI having a related data item stored on it and having sufficient actual storage space remaining for storing the data item (see components 70a, 70b, and 70c of FIG. 3); multiplying the actual size of a data field, which is not stored on the related RMI by a factor, greater than 1, to produce reserved storage space data field which characterizes any other RMI that actually stores the data item (see components 70a, 70b, and 66); storing a data item on an unrelated RMI, the unrelated RMI having one or more unrelated data items stored on it and having sufficient actual and unreserved storage space remaining to store the data item, and if there is no related RMI, then storing the data item on a new RMI, the new RMI having no data stored on it (see components 80a, 80b, 80c, and 80d of FIG. 3).

An even broader method for the system of dispersing storage of a plurality of related and unrelated data items on a plurality of removable recordable media instances (RMIs) can be employed. This method may include reserving storage space for a RMI: (1) if a data item is stored on a new RMI, the new RMI having no data items stored on it, or (2) if a data item is stored on an unrelated RMI, the unrelated RMI having unrelated data stored on it and having sufficient actual and reserved storage space for storing the data item (see all the components of the storage dispersal system 40b in FIG. 3 except component 70c); and, storing a data item on a related RMI, the related RMI having related data stored on it and having sufficient actual storage space for storing the data item or, if there is no related RMI, then storing the data item on an unrelated RMI, the unrelated RMI having one or more unrelated data items stored on it and having sufficient actual and unreserved storage space remaining to store the data item, or if there is no unrelated RMI then storing the data item on a new RMI, the new RMI having no data item stored on it (see all the components of the storage dispersal system 40b in FIG. 3).

Any of the aforementioned methods may further include the step of providing a plurality of RMIs stored in respective locations in a library; transporting a selected RMI to a remote location; and, writing data items to be stored on the RMI at the remote location. The methods may further include composing or processing data items with data which identifies each data item by a subject matter field and actual size field required to store the data on a RMI; transporting the selected RMI to a remote location from the library; and, reading the RMI at the remote location.

OPERATION OF THE INVENTION

Figure 5:
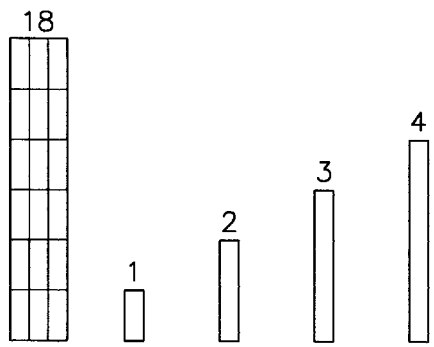
FIGS. 5–10 are diagrams illustrating the operation of the invention.

An exemplary operation of the invention is illustrated in FIGS. 5 through 10 of the drawings. To describe this operation, various constraints will be incorporated from the various embodiments 40a, 40b, and 40c of the storage dispersal system. One of the constraints will be a system table which includes a predetermined number (C) of RMIs that will be used. For the example, we can assume that the number of RMIs in the system table is some constant number, such as 5. This teaching is provided in the description of the RMI directory 68 in FIG. 4. This system table will progressively sequence up through the RMIs dropping off RMIs which no longer have sufficient available space to receive a new data item. This could be accomplished by components 80d and 68 of FIG. 4. Further, a constraint can be applied that three data items per collection are anticipated. This will be the value t in the FIG. 3 or FIG. 4 embodiment, and for simplicity, we can let this value equal 3. Further, as shown in FIG. 5, we can assume that the storage capacity of a single RMI is 18 space units, and that data items can have space unit requirements of 1, 2, 3, or 4.

Figure 6:
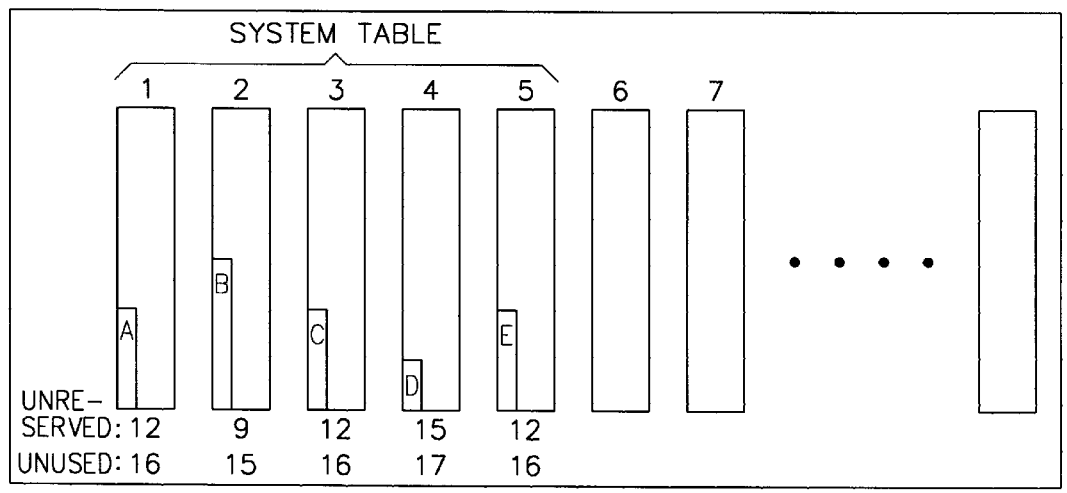

FIG. 6 shows RMIs numbered 1–5 in the system table with RMIs 6 and 7 above the system table. RMI 5 would be the Nth RMI and RMI 6 would be the N+1 RMI. Assume that new data items (A, B, C, D, and E) are received. Initially, the system table (RMIs 1–5) is empty and the receipt of each new data item causes a new RMI to be added to the system table for the storage of the just received data item. This function is also described for the RMI directory 68 shown in FIG. 4. As a result, the data items of the respective subject matters (collections) are dispersed among all of the RMIs (1, 2, 3, 4, and 5) represented in the system table. Data item A was the first data item and it caused RMI 1 to be added to the system table. Data item A requires two space units. Since the estimated size for the collection of such data items is assumed to be 3, then the two space units is multiplied by 3 to provide six space units which represents the space to be reserved on the RMI for subsequently received data items belonging to the same collection. The six reserved space units is then subtracted from the original 18 unreserved space units leaving 12 unreserved space units. The actual storage size of the data item A, which is two space units, is subtracted from the total unused space of 18 space units leaving the first RMI with 16 unused or actual space remaining units. The same calculations are applied to data items B, C, D, and E which all belong to different subject matters (collections).

Figure 7:
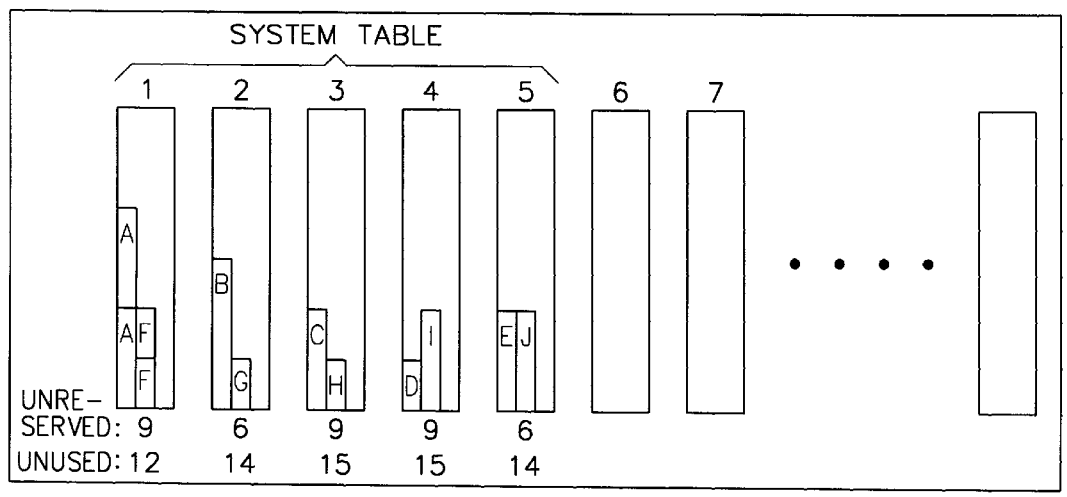

FIG. 7 illustrates the receipt of 5 more data items (F, G, H, I, and J) of new collections which are dispersed among all of the RMIs (1, 2, 3, 4, and 5) which are in the system table. When data item F is received, the system table is examined to find the RMI with the least number of subject matters (collections) that can contain the new data item. The first data item F requires one space unit. This one space unit is multiplied by 3 to provide three reserved space units. Since any of the RMIs in the system table are equally capable of accepting this new data item, that is that they all have sufficient actual storage space (a') and unreserved storage space (r'), the data item is placed on the RMI that has the lowest number, namely, RMI 1. The reserved storage space of 3 units is then subtracted from the unreserved space of 12 space units, leaving 9 unreserved space units. The actual storage size of one space unit is then subtracted from the unused space of 16 space units leaving 15 unused space units. These same calculations would be applied to data items G, H, I, and J. FIG. 7 also shows the receipt of data items (A, F) which are related to previously received data items, namely, they are in the same respective collection. These data items are placed on RMI 1 since that is where the previously received data items are located. Data item A requires 2 space units so this is subtracted from the unused space of 15 units, leaving 13 unused space units. The other data item F requires 1 space unit so this is subtracted from the unused space of 13 units leaving 12 unused space units. It should be noted that when these latter two data items A and F were stored their actual storage requirements were not multiplied times the number 3 to provide a reserved storage space. The storage space for the latter two data items A and F had already been previously reserved.

Figure 8:
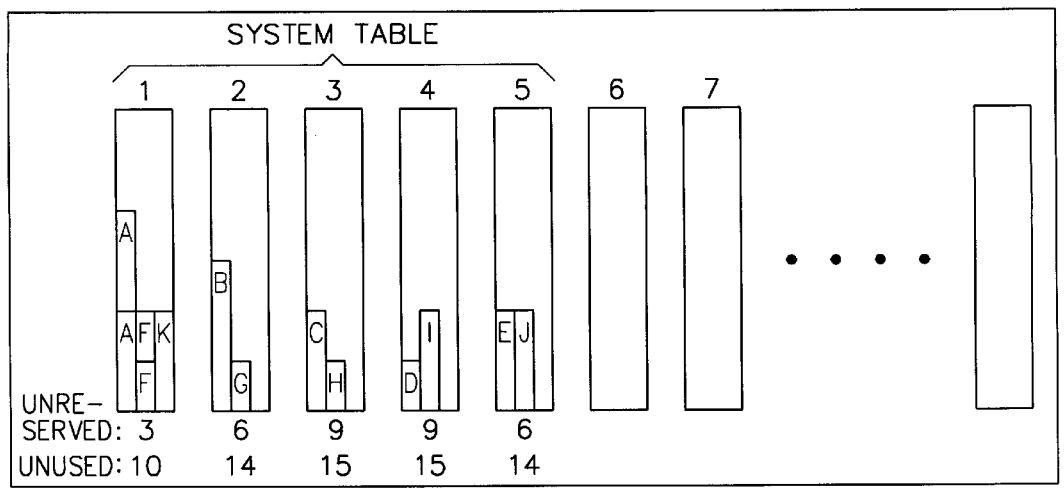

In FIG. 8, a new data item K is received. When data item K is received the system table (RMIs 1–5) is examined to find the RMI with the least number of collections of data items that can receive the data item K for a new collection. The data item K requires 2 space units which is multiplied times 3 to provide 6 reserved space units. Any of the RMIs of the system table are equally capable accepting the new date item, since they have the same number of collections of data items, namely, 2, and each of the RMIs has sufficient unreserved space and sufficient unused space to accommodate the 6 reserved space units. Accordingly, the first RMI 1 is used. The 6 reserved space units is then subtracted from the unreserved space of 9 space units leaving 3 unreserved space units. The actual data items size of 2 space units is subtracted from the unused space of 12 space units leaving 10 unused space units.

Figure 9:
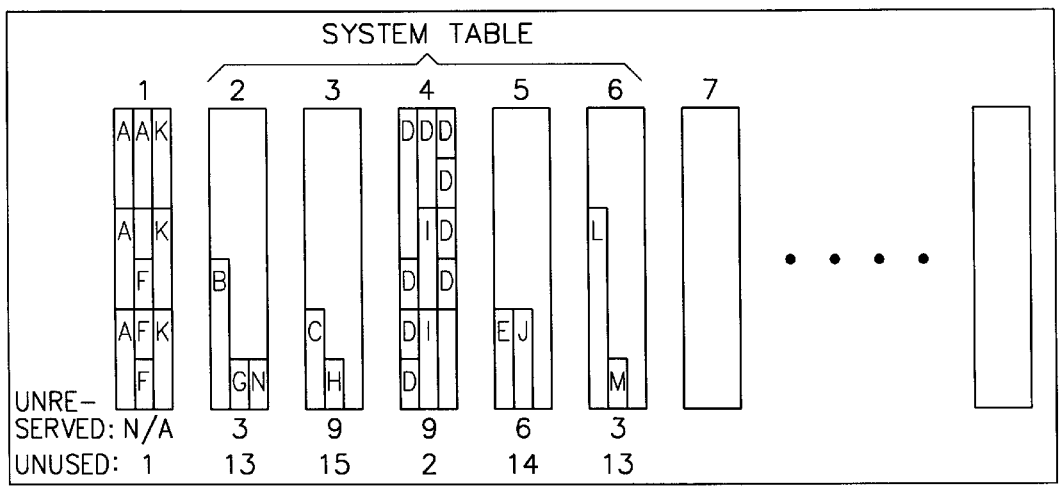

In FIG. 9, still another new data item L of a new collection is received. This data item requires 4 space units. The number of space units reserved for subsequently arriving data items L of the same collection will be 4 times 3 which results in 12 reserved space units. It should be noted that none of the RMIs in the system table, 1–5, are capable of accepting the new data item since none of these RMIs have sufficient unreserved space remaining to accommodate the 12 space units. Since RMI 1 has the least available space of 3 space units, it is removed from the system table and RMI 6 is added to the system table. The system table now comprises RMIs 2–6. The new data item L is then stored on the new RMI 6 since it has the least number of collections of data items stored on it. Assuming the receipt of still another new data item M, it will also be added to the RMI 6 since it has the least number of collections of data items on it. Assuming the arrival of additional data items (A, F, K), they will be stored on RMI 1 even though it is no longer in the system table. RMIs which have been removed from the system table will accept additional related data items until there is no more actual space available. Also assume that additional data items D and I are received, some of the data items D having different sizes of space units required for actual storage. It should be noted that the first data item D required only one space unit and the reserved space for this data item was only 3 space units. In spite of this low amount of reserved space provided for the collection, which includes the data item D, there is still sufficient unused space on the RMI 4 to accommodate the actual space requirements of the subsequently arriving data items D. This operation shows the considerable flexibility in the system to accommodate related data items even though the estimation of the size of the overall collection of data items has been smaller than what it should be. Further, let us assume that a new data item N is received and that it requires 1 space unit. A reserved space for the collection including this data item will be 1 times 3 which is 3 space units. All of the RMIs in the system table 2–6 are examined. All of the RMIs have the same number of collections of data items, namely, 2. However, not all of the RMIs are capable of accepting the new data item N. Specifically, RMI 4 has unreserved space of 9 space units and unused space of 2 space units. The 2 space units will not accommodate the 3 reserved space units required by the data item N. Since any of the remaining RMIs (2, 3, 5, and 6) are capable of accepting the new data item N, that is the unreserved space and the unused space of each is greater than or equal to 3, the lowest number RMI in the system table will be used, namely, RMI 2.

Figure 10:
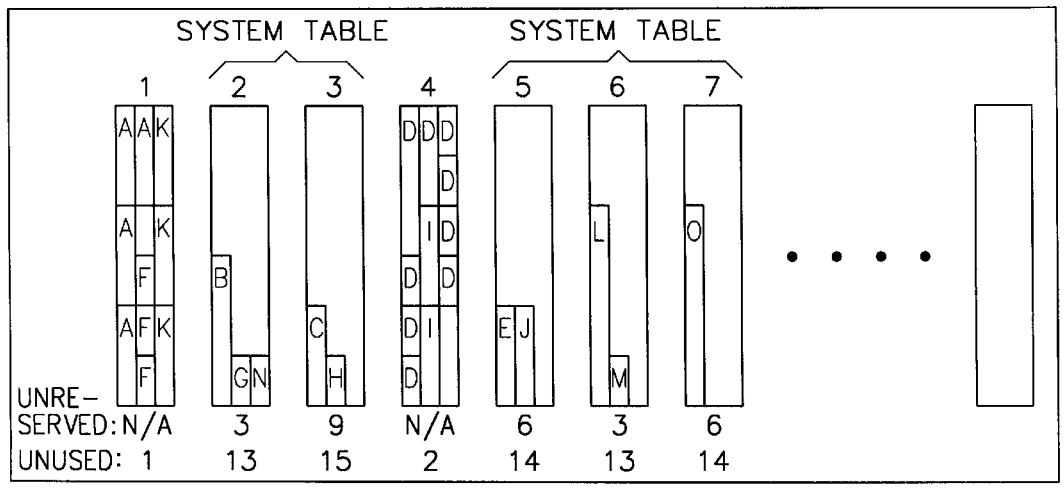

In FIG. 10, a new data item O is received. This data item requires 4 space units. The number of reserved space units for this data item will be 4 times 3 which is 12 space units. None of the RMIs in the system table are capable of accepting this new data item since none has sufficient unreserved space to accommodate the 12 space units. Since RMI 4 has the least available space (the lesser of the unused or unreserved space) of 2 space units, it will be removed from the system table and RMI 7 will be added to the system table so that the system table now comprises RMI 2, 3, 5, 6, and 7.

It is now readily apparent that the present invention provides a storage dispersal unit which will store data items of various collections on removable recordable media instances (RMIs) so that users can quickly access data items of requested collections (subject matters). When a data item of a new collection is added to a RMI library, space is reserved on the particular RMI for subsequently arriving data items of the same collection. This groups the data items into proximate locations for each collection so that, in most instances, access is required of fewer RMIs for information retrieval where fewer=$\{n:1 \leq n<<N\}$. The storage dispersal unit can be implemented in the form of hardware and/or software for use with personal computer workstations and with a library of RMIs wherein individual RMIs can be transported for writing and reading functions.

Although the invention has been described in terms of a specific embodiment, the inventors contemplate that modifications and substitutions to various components of the inventions would occur to persons of ordinary skill in the art and, therefore, would be within the scope of the invention, which is to be limited only by the claims which follow.

We claim:

1. A unit for dispersing storage of a plurality of related and unrelated data items on a plurality of removable recordable media instances (RMIs) comprising:

reserving means for reserving storage space for any future related data items on an RMI: (1) if a related data item is stored on a new RMI, the new RMI having no data item previously stored on it or (2) if the related data item is stored on a qualifying unrelated RMI, the qualifying unrelated RMI having one or more unrelated data items stored on it and having sufficient actual and unreserved storage space for storing the related data item; and storing means, coupled to the reserving means, for storing the related data item on a qualifying related RMI, the qualifying related RMI having related data stored on it and having sufficient actual storage space for storing the related data item or, if there is no qualifying related RMI, then storing the related data item on said qualifying unrelated RMI, the qualifying unrelated RMI having one or more unrelated data items stored on it and having sufficient actual and unreserved storage space remaining to store the related data item or, if there is no qualifying unrelated RMI, then storing the related data item on a new RMI, the new RMI having no data items stored on it.

2. A unit as claimed in claim 1 including the reserving means including means for multiplying the actual size of the data item by a factor greater than one to provide the reserved storage space.

3. A unit as claimed in claim 1 including the storing means storing the data item on the qualifying unrelated RMI which has the least number unrelated collections of data items stored on it if there is more than one qualifying unrelated RMI.

4. A combination, including the unit of claim 1, the combination comprising:

a plurality of RMIs stored in respective locations in a library;

a writing device responsive to the storing means for writing data items to the RMIs; and transport means responsive to the storing means for transporting selected RMIs between the library and the writing device.

5. A combination as claimed in claim 4 wherein the unit of claim 1 is a programmed digital device.

6. A combination as claimed in claim 4 including:

a plurality of workstations for generating data items D and for generating data fields which identify each data item D by subject matter (s) and actual size (a) required to store the data item D on a RMI, each workstation being connected to the reserving means and the storing means;

a read device connected to the workstations for reading data items D on the RMIs; and said transport device also being responsive to the workstations for transporting selected RMIs between the library and the RMI reading device.

7. A combination as claimed in claim 6 wherein the reserving means include means for multiplying the actual size (a) data field of the data item D by a factor greater than one to provide the reserved storage space (r) data field.

8. A combination as claimed in claim 7 wherein the storing means stores the data item on the qualifying unrelated RMI which has the least number of unrelated collections of data items stored on it if there are more than one qualifying unrelated RMI.

9. A unit as claimed in claim 1 wherein the storage space reserved on said RMI is available for storing any additional data item related to any data item already stored on said RMI.

10. A unit as claimed in claim 9 including the reserving means including means for multiplying the actual size of the data item by a factor greater than one to provide the reserved storage space.

11. A unit as claimed in claim 9 including the storing means storing the data item on the qualifying unrelated RMI which has the least number unrelated collections of data items stored on it if there is more than one qualifying unrelated RMI.

12. A unit as claimed in claim 9 including the the unit of claim 1, the combination comprising:

a plurality of RMIs stored in respective locations in a library;

a writing device responsive to the storing means for writing data items to the RMIs; and transport means responsive to the storing means for transporting selected RMIs between the library and the writing device.

13. A unit as claimed in claim 12 including:

a plurality of workstations for generating data items D and for generating data fields which identify each data item D by subject matter (s) and actual size (a) required to store the data item D on a RMI, each workstation being connected to the reserving means and the storing means;

a read device connected to the workstations for reading data items D on the RMIs; and said transport device also being responsive to the workstations for transporting selected RMIs between the library and the RMI reading device.

14. A unit as claimed in claim 13 wherein the reserving means include means for multiplying the actual size (a) data field of the data item D by a factor greater than one to provide the reserved storage space (r) data field.

15. A unit for dispersing storage of a plurality of related and unrelated data items on a plurality of removable recordable media instances (RMIs) comprising:

first storage means for storing a data item on a qualifying related RMI, the qualifying related RMI having one or more related data items stored on it and having sufficient actual storage space remaining for storing the data item;

multiplier means, connected to the first storage means, for multiplying the actual size of a data item, which is not stored by the first storage means because there is no qualifying related RMI, by a factor greater than one, to produce reserved storage space data which is available for storing any additional data items related to said data item or to any unrelated data item previously stored on an RMI with said data item; and second storage means responsive to the multiplier means for storing a data item on a qualifying unrelated RMI, the qualifying unrelated RMI having one or more unrelated data items stored on it and having sufficient actual and sufficient unreserved storage space remaining equal to or greater than said reserved storage space data to store the data item and, if there is no qualifying related RMI, then storing the data item on a new RMI, the new RMI having no data stored on it.

16. A unit as claimed in claim 15 wherein the second storage means stores the data item on the qualifying unrelated RMI which has the least number of unrelated collections of data items stored on it if there are more than one qualifying unrelated RMI.

17. A combination, including the unit of claim 15, the combination comprising:
a plurality of RMIs stored in respective library locations;
a writing device responsive to the first and second storage means for writing data items to the RMIs; and
transport means responsive to the first and second storage means for transporting selected RMIs between the library and the RMI writing device.

18. A combination as claimed in claim 11 wherein the unit of claim 15 is a programmed digital device.

19. A combination as claimed in claim 11 including:
a plurality of workstations which generate data items D and data fields which identify each data item by subject matter (s) and actual size (a) required to store the data item on a RMI, each workstation being connected to the first and second storage means;
a read device connected to the workstations for reading data items on the RMIs; and
said transport device also being responsive to the workstations for transporting selected RMIs between the library and the RMI reading device.

20. A combination as claimed in claim 19 wherein the second storage means stores the data item on the qualifying unrelated RMI which has the least number of unrelated collections of data items stored on it if there is more than one qualifying unrelated RMI.

21. A unit for dispersing storage of a plurality of data items D across a plurality of removable recordable media instances (RMIs) comprising:
each data item D being part of a controlled data item $D_{(s,a)}$ where (s) is a data field indicating the subject matter of the data item and (a) is a data field indicating the actual amount of storage space needed on a RMI to store the data item;
each RMI being designated $I_{n(s',a',r')}$ if the RMI is partially full by having one or more data items stored on it and by $I_{(N+1)}$ if the RMI is the N+1 RMI and is new because no data item has been stored on it, where n is the number of the RMI for all values of n from 1 to N, (s') is data indicating one or more subject matters of one or more data items stored on the nth RMI, (a') is a data field indicating actual storage space remaining on the nth RMI and (r') is a data field indicating the reserved storage space remaining on the nth RMI;
multiplier means for receiving actual size (a) data field of a controlled data item $D_{(s,a)}$ and multiplying it times a factor (t) greater than one to produce a data field representing a reserved size (r) of the controlled data item $D_{(s,a)}$, thereby providing a controlled data item $D_{(s,r)}$ which is the same as controlled data item $D_{(s,a)}$ except its data field size has been modified from actual size (a) data field to reserved size (r) data field;

RMI directory means for receiving subject matter data (s) field, actual size data (a) field and reserved size data (r) field of data items D stored on RMIs ($I_n$ and $I_N$) for providing an updated RMI data field listing (p) of $I_{n(s',a',r')}$ for all values of n from n=1 to n=N where for each RMI corresponding to $I_{n(s',a',r')}$ an updated reserved size data r' is reserved storage reserved on said RMI corresponding to a data item stored on said RMI or a pool of combined reserved storages reserved on said RMI for said data item and one or more unrelated data items already stored on said RMI so that the updated reserved size data r' corresponds to reserved storage on said RMI which is available for storing any additional data items related to any data item already stored on the RMI;

first comparator and storage means responsive to the data listing (p) in the RMI directory means for receiving a controlled data item $D_{(s,a)}$ for storing the data item D part of the controlled data item $D_{(s,a)}$ on any reserved space and unreserved space, if needed, of a qualifying related RMI ($I_n$), the subject matter data (s) of controlled labeled data item $D_{(s,a)}$ comparing with subject matter data (s') of the qualifying related RMI ($I_n$) within the RMI data field listing (p) and the actual size data (a) of the controlled data item being equal to or less than the actual storage space data (a') remaining on the qualifying related RMI, and for indicating any data part D of controlled data item $D_{(s,a)}$ which is not stored because there is no qualifying related RMI;

the RMI directory means being connected to the first comparator and storage means for receiving (s) and (a) data fields of corresponding data items D stored on the RMIs ($I_n$) to recalculate the (s') and (a') data fields for the RMIs ($I_n$);

the multiplier means being responsive to the first comparator and storage means for receiving said actual size data (a) field of any controlled data item $D_{(s,a)}$ when the data portion D thereof is not stored by the first comparator means because there is no qualifying related RMI;

second comparator and storage means responsive to the data listing (p) in the RMI directory and the multiplier means for storing a data item D part of a controlled data item $D_{(s,r)}$ on a qualifying unrelated RMI ($I_n$), the reserved size (r) of the controlled data item $D_{(s,r)}$ being less than or equal to the remaining actual storage size (a') of the qualifying unrelated RMI and less than or equal to the remaining reserved storage size (r') of the qualifying unrelated RMI ($I_n$) and, if there is no qualifying unrelated RMI then storing the data item D part of the controlled data item $D_{(s,r)}$ on a new RMI ($I_{N+1}$), the new RMI having no data item D previously stored on it; and the RMI directory means being connected to the second comparator means for receiving the (s), (a) and the (r) data of corresponding data items D stored on the RMIs ($I_n$ and $I_{N+1}$) to recalculate the (s'), (a'), and (r') data for the RMIs ($I_n$).

22. A unit as claimed in claim 21 including the second comparator and storage means storing the data D corresponding to labeled data item $D_{(s,r)}$ on the qualifying unrelated RMI ($I_n$) which has the least number of unrelated collections of data items stored on it and, if there is more than one qualifying, unrelated RMI, then storing the data on the qualifying unrelated RMI which has the least n in the set n=1 to n=N.

23. A unit as claimed in claim 21 including the multiplier means multiplying the actual size data (a) field of the labeled data item ($D_{s,a}$) times a factor (t) which is in the range of 1 to some finite number.

24. A unit as claimed in claim 21 wherein N is an integer greater than one.

25. A combination including the unit of claim 21, the combination comprising:
   a plurality of RMIs stored in respective locations in a library;
   a writing device, responsive to the first and second comparator and storage means, for writing data items to the RMIs; and
   transport means, responsive to the first and second comparator and storage means, for transporting selected RMIs between the library and the RMI writing device.

26. A combination as claimed in claim 25 wherein the unit of claim 21 is a programmed digital device.

27. A combination as claimed in claim 25 including:
   a plurality of workstations for generating data items D and data fields which identify each data item D by subject matter (s) and actual size (a) required to store the data item D on a RMI, each workstation being connected to the first and second storing storage means;
   a RMI read device connected to each workstation for reading data items on the RMIs; and
   said transport device also being responsive to the workstations for transporting selected RMIs between the library and the RMI reading device.

28. A combination as claimed in claim 27 including:
   the second comparator and storage means storing the data D part of controlled data item $D_{(s,r)}$ on the qualifying unrelated RMI ($I_n$) which has the least number of unrelated collections of data items stored on it and, if there is more than one such qualifying unrelated RMI, then storing the data on the qualifying unrelated RMI which has the least n in the set n=1 to n=N.

29. A combination as claimed in claim 28 including the multiplier means multiplying the actual size data (a) field of the controlled data item ($D_{s,a}$) time a factor (t) which is in the range of 1 to some finite number.

30. A combination as claimed in claim 29 wherein N is an integer greater than one.

31. A method of dispersing storage of a plurality of related and unrelated data items on a plurality of removable recordable media instances (RMIs) comprising the steps of:
   reserving storage space for any future related data items on a RMI: (1) if a related data item is stored on a new RMI, the new RMI having no data item previously stored on it or (2) if the related data item is stored on a qualifying unrelated RMI, the qualifying unrelated RMI having one or more unrelated data items stored on it and having sufficient actual and unreserved storage space for storing the related data item;
   storing the related data item on a qualifying related RMI, the qualifying related RMI having related data stored on it and having sufficient actual storage space for storing the related data item or, if there is no qualifying related RMI, then storing the related data item on said qualifying unrelated RMI, the qualifying unrelated RMI having one or more unrelated data items stored on it and having sufficient actual and unreserved storage space remaining to store the related data item or, if there is no qualifying unrelated RMI, then storing the related data item on a new RMI, the new RMI having no data item stored on it.

32. A method as claimed in claim 31 including the step of:
   when storing the data item on the qualifying unrelated RMI storing the data item on the qualifying unrelated RMI which has the least number of unrelated collections of data items stored on it if there is more than one qualifying unrelated RMI.

33. A method of dispersing storage of a plurality of related and unrelated data items on a plurality of removable recordable media instances (RMIs) comprising the steps of:
   storing a data item on a qualifying related RMI, the qualifying related RMI having one or more related data items stored on it and having sufficient actual storage space remaining for storing the data item;
   multiplying the actual size of a data item, which is not stored by the first storage means because there is no qualifying related RMI, by a factor greater than one, to produce reserved storage space data which is available for storing any additional data items related to said data item or to any unrelated data item previously stored on an RMI with said data item; and
   storing said data item on a qualifying unrelated RMI, the qualifying unrelated RMI having one or more unrelated data items stored on it and having sufficient actual and sufficient unreserved storage space remaining equal to or greater than said reserved storage space data to store the data item and, if there is no qualifying related RMI, then storing the data item on a new RMI, the new RMI having no data stored on it.

34. A method as claimed in claim 33 including the step of:
   when storing the data item on the qualifying unrelated RMI storing the data item on the qualifying unrelated RMI which has the least number of unrelated collections of data items stored on it if there are more than one qualifying unrelated RMI.

35. A method of dispersing storage of a plurality of data items D across a plurality of removable recordable media instances (RMIs) comprising the steps of:
   providing controlled data item $D_{(s,a)}$, of which data item D is a part, where (s) is a data field indicating the subject matter of the data item and (a) is a data field indicating the actual amount of storage space needed on a RMI to store the data item;
   designating each RMI $I_{n(s',a',r')}$ if the RMI is partially full by having one or more data items stored on it and by $I_{(N+1)}$ if the RMI is the N+1 RMI and is new because no data item has been stored on it, where n is the number of the RMI for all values of n from 1 to N, (s') is a data field indicating one or more subject matters of one or more data items stored on the nth RMI, (a') is a data field indicating actual storage space remaining on the nth RMI and (r') is a data field indicating the reserved storage space remaining on the nth RMI;
   receiving actual size data (a) field of a controlled data item $D_{(s,a)}$ and multiplying the actual size data (a) field times a factor (t) greater than one to produce a data field representing a reserved size (r) data field of the data item D, thereby providing a controlled data item $D_{(s,r)}$ which is the same as controlled data item $D_{(s,a)}$ except its data field size has been modified from actual size (a) data field to reserved size (r) data field;

receiving subject matter data (s) field, actual size data (a) field and reserved size data (r) field of data items D stored on RMIs ($I_n$ and $I_N$) for providing an updated RMI data field listing (p) of $I_{n(s',a',r')}$ for all values of n from n=1 to n=N where for each RMI corresponding to $I_{n(s',a',r')}$ an updated reserved size data r' is reserved storage reserved on said RMI corresponding to a data item stored on said RMI or a pool of combined reserved storages reserved on said RMI for said data item and one or more unrelated data items already stored on said RMI so that the updated reserved size data r' corresponds to reserved storage on said RMI which is available for storing any additional data items related to any data item already stored on the RMI;

receiving data field listing (p) and a controlled data item $D_{(s,a)}$ for storing the data item D part of the controlled data item $D_{(s,a)}$ on any reserved space and unreserved space, if needed, of a qualifying related RMI ($I_n$), the subject matter data (s) of the controlled data item $D_{(s,a)}$ comparing with subject matter data (s') of the qualifying related RMI ($I_n$) within the RMI data field listing (p) and the actual size data (a) of the controlled data item being equal to or less than the actual storage space data (a') remaining on the qualifying related RMI, and for indicating any data portion D of controlled data item $D_{(s,a)}$ which is not stored because there is no qualifying related RMI;

receiving (s) and (a) data field of corresponding data items D stored on the RMIs ($I_n$) to recalculate the (s') and (a') data field for the RMIs ($I_n$);

storing the data item D part of a controlled data item $D_{(s,r)}$ on a qualifying unrelated RMI ($I_n$), the reserved size (r) of the controlled data item $D_{(s,r)}$ being less than or equal to the remaining actual storage size (a') of the qualifying unrelated RMI and less than or equal to the remaining reserved storage size (r') of the qualifying unrelated RMI ($I_n$) and, if said data item D is not stored because there is no qualifying unrelated RMI then storing the data item D part of the controlled data item $D_{(s,r)}$ on a new RMI ($I_{N+1}$), the new RMI having no data item D previously stored on it; and receiving the (s), (a) and the (r) data fields of corresponding data items D stored on the RMIs ($I_n$ and $I_{N+1}$) to recalculate the (s'), (a'), and (r') data fields for the RMIs ($I_n$ and $I_{n+1}$).

36. A method as claimed in claim 35, including the steps of:

storing the data D part of the controlled data item $D_{(s,r)}$ on the qualifying unrelated RMI ($I_n$) which has the least unrelated data items stored on it and, if there is more than one qualifying unrelated RMI, then storing the data on the qualifying unrelated RMI which has the least n in the set n=1 to n=N; and multiplying the actual size data (a) field of the controlled data item ($D_{s,a}$) times a factor (t) which is in the range of 1 to some finite number.

* * * * *

UNITED STATES PATENT AND TRADEMARK OFFICE
CERTIFICATE OF CORRECTION

PATENT NO. : 5,860,132
DATED : January 12, 1999
INVENTOR(S) : Carter et al

It is certified that error appears in the above-indentified patent and that said Letters Patent is hereby corrected as shown below:

Column 25, line 29, change "11" to --17--.

Column 25, line 31, change "11" to --17--.

Signed and Sealed this

Third Day of August, 1999

Attest:

Q. TODD DICKINSON

Attesting Officer

Acting Commissioner of Patents and Trademarks